US012275359B2

(12) United States Patent
Hargett et al.

(10) Patent No.: US 12,275,359 B2
(45) Date of Patent: Apr. 15, 2025

(54) ONE-PIECE CO-MOLDED SNAP-ON APPARATUS, AND SUPPORT SYSTEM AND METHOD OF USING THE SAME

(71) Applicant: The Boeing Company, Arlington, VA (US)

(72) Inventors: Michael B. Hargett, Charleston, SC (US); Todd M. Vakos, Johns Island, SC (US); Brian Erick Waters, Holly Hill, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/336,950

(22) Filed: Jun. 16, 2023

(65) Prior Publication Data
US 2024/0416851 A1    Dec. 19, 2024

(51) Int. Cl.
*B60R 16/02* (2006.01)
*H02G 3/32* (2006.01)

(52) U.S. Cl.
CPC ........... *B60R 16/0215* (2013.01); *H02G 3/32* (2013.01); *B64D 2221/00* (2013.01)

(58) Field of Classification Search
CPC .. B60R 16/0215; H02G 3/32; B64D 2221/00; F16L 3/127; F16L 3/2431; F16L 3/13; F16L 3/2235
See application file for complete search history.

(56) References Cited

U.S. PATENT DOCUMENTS

| | | |
|---|---|---|
| 3,157,377 A | 11/1964 | Orenick |
| 4,244,544 A | 1/1981 | Kornat |
| 5,149,027 A | 9/1992 | Weber |
| 5,189,766 A | 3/1993 | Weber |
| 5,333,822 A | 8/1994 | Benoit et al. |
| 5,799,906 A | 9/1998 | Hillegonds |
| 5,967,468 A | 10/1999 | Veghte et al. |

(Continued)

FOREIGN PATENT DOCUMENTS

DE    202014008285 U1    1/2015

OTHER PUBLICATIONS

Michael Bruton Hargett et al., pending unpublished U.S. Appl. No. 17/827,693, filed May 28, 2022, Assigned to USPTO.

(Continued)

*Primary Examiner* — Monica E Millner

(57) ABSTRACT

There is provided a one-piece co-molded snap-on apparatus for supporting one or more elongate elements. The apparatus includes a ring post and a snap-on attachment base co-molded to the ring post for a snap-on attachment to an elongate bar structure. The snap-on attachment base includes a top support portion integral with the ring post, and a bottom attachment portion with side arms opposite each other and designed to snap fit against opposing sides of the elongate bar structure. Each side arm has a snap-fit edge portion formed at a bottom end. Each snap-fit edge portion has a topmost surface designed to fit against a bottommost surface of the elongate bar structure, and each snap-fit edge portion has a triangular shape and has at least two through openings. At least one centering element projects from an interior surface of the snap-on attachment base into a channel formed between the side arms.

20 Claims, 20 Drawing Sheets

(56) References Cited

U.S. PATENT DOCUMENTS

| | | | |
|---|---|---|---|
| 6,443,403 | B1 | 9/2002 | Page et al. |
| 6,729,585 | B2 | 5/2004 | Ogden |
| 6,880,787 | B2 | 4/2005 | Stephen et al. |
| 7,523,898 | B1 | 4/2009 | Barry et al. |
| 7,654,492 | B2 * | 2/2010 | Balderama ............... F16L 3/243 |
| | | | 248/74.2 |
| 7,686,259 | B2 | 3/2010 | Caveney et al. |
| 7,770,852 | B2 * | 8/2010 | Caveney ................. H02G 3/32 |
| | | | 411/401 |
| 8,313,064 | B2 * | 11/2012 | Stocker .................. F16L 3/123 |
| | | | 248/71 |
| 8,403,272 | B2 | 3/2013 | Ohno |
| 9,377,135 | B2 * | 6/2016 | Karls ...................... F16L 3/127 |
| 9,470,252 | B2 | 10/2016 | Karls |
| 10,096,934 | B1 * | 10/2018 | Desjardins ......... H01R 13/5841 |
| 10,907,679 | B2 | 2/2021 | Shehab |
| 11,906,089 | B2 * | 2/2024 | Hargett ................ F16B 7/0493 |
| 2004/0037667 | A1 | 2/2004 | Stephen |
| 2004/0206855 | A1 * | 10/2004 | Caveney .................. H02G 3/32 |
| | | | 248/65 |
| 2005/0242245 | A1 | 11/2005 | Balderama et al. |
| 2005/0258314 | A1 | 11/2005 | Schilles et al. |
| 2006/0080933 | A1 | 4/2006 | Robicheau |
| 2010/0294896 | A1 | 11/2010 | Sayilgan |
| 2015/0060612 | A1 * | 3/2015 | Blanchard ................ H02G 3/32 |
| | | | 248/74.3 |
| 2019/0078606 | A1 | 3/2019 | Shehab |

OTHER PUBLICATIONS

Anixter Inline Ratchet P-Clamps from HellermannTyton, dated Nov. 1, 2019 https://www.anixter.com/en_us/manufacturers/h/hellermanntyton/hellermanntyton-inline-ratchet-p-clamp.html (Year: 2019), 3 pages.

HellermannTyton, Engineered Fastening Solutions, Jul. 2011, Bundle separation products, Mounts, and Cable management product catalog, (Year: 2011), 152 pages.

McMaster-Carr Strut Channel Framing and Fitting online product data page dated Jun. 12, 2020, https://www.mcmaster.com/strut-channel-systems/ (Year: 2020), 7 pages.

* cited by examiner

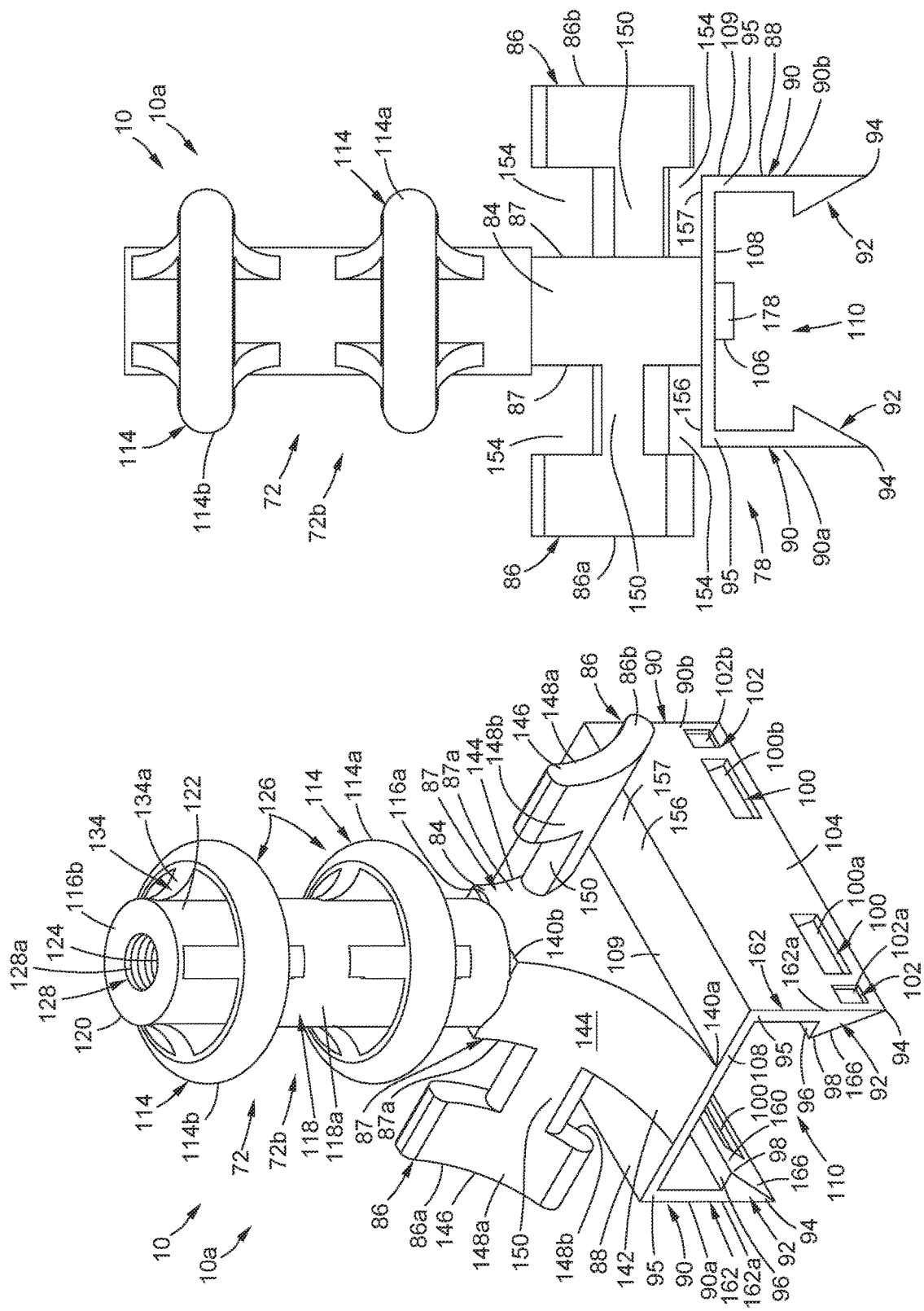

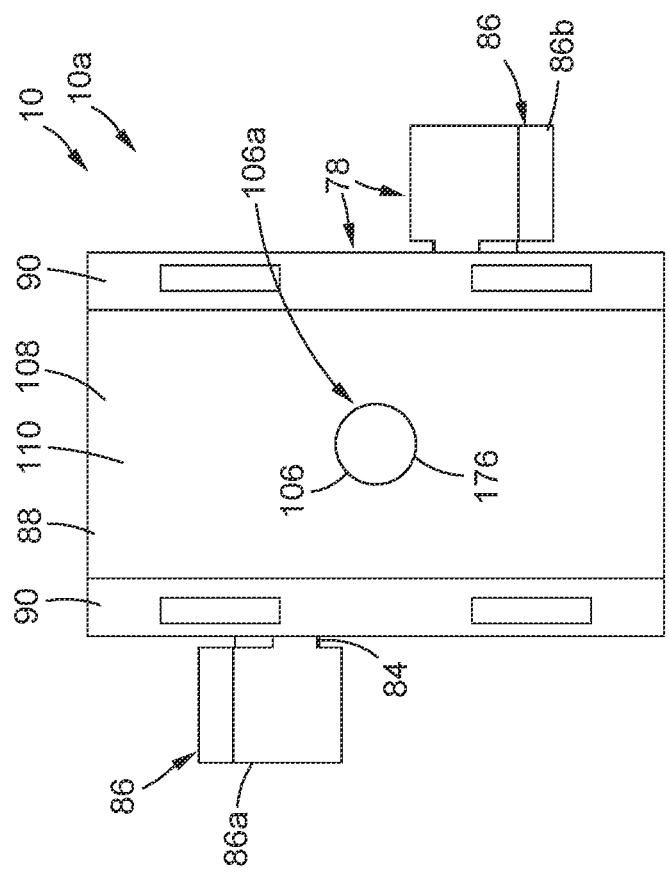
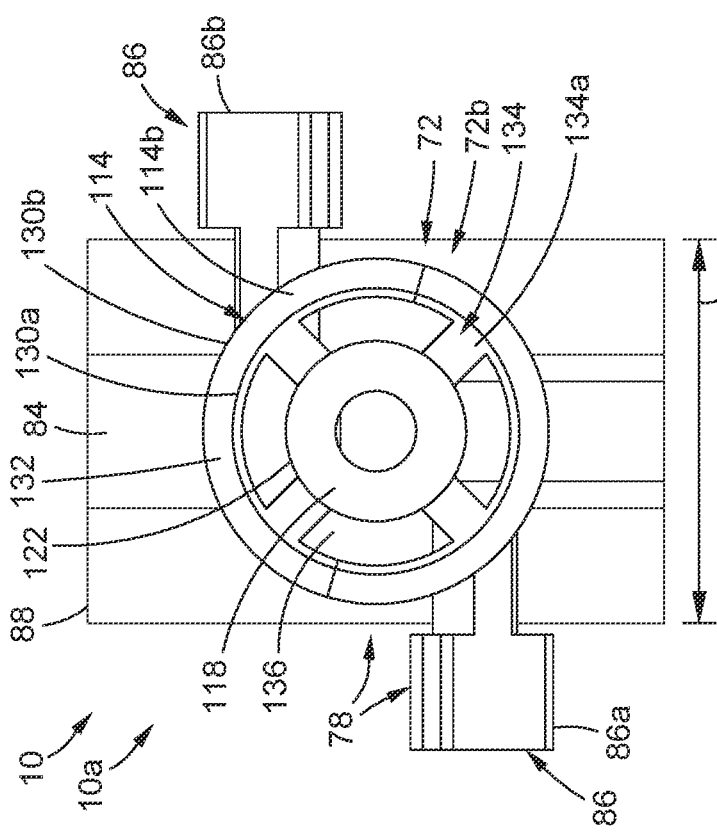

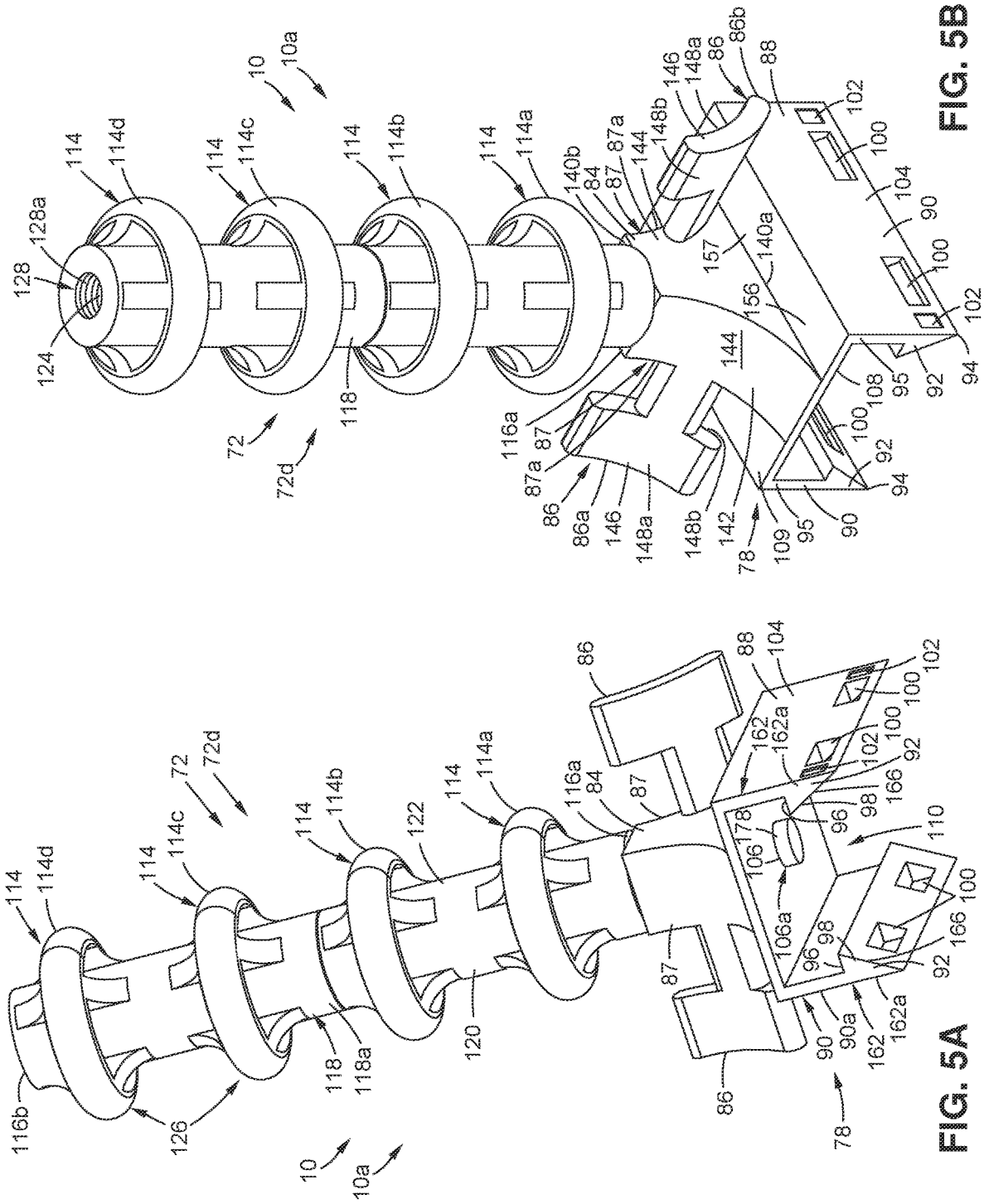

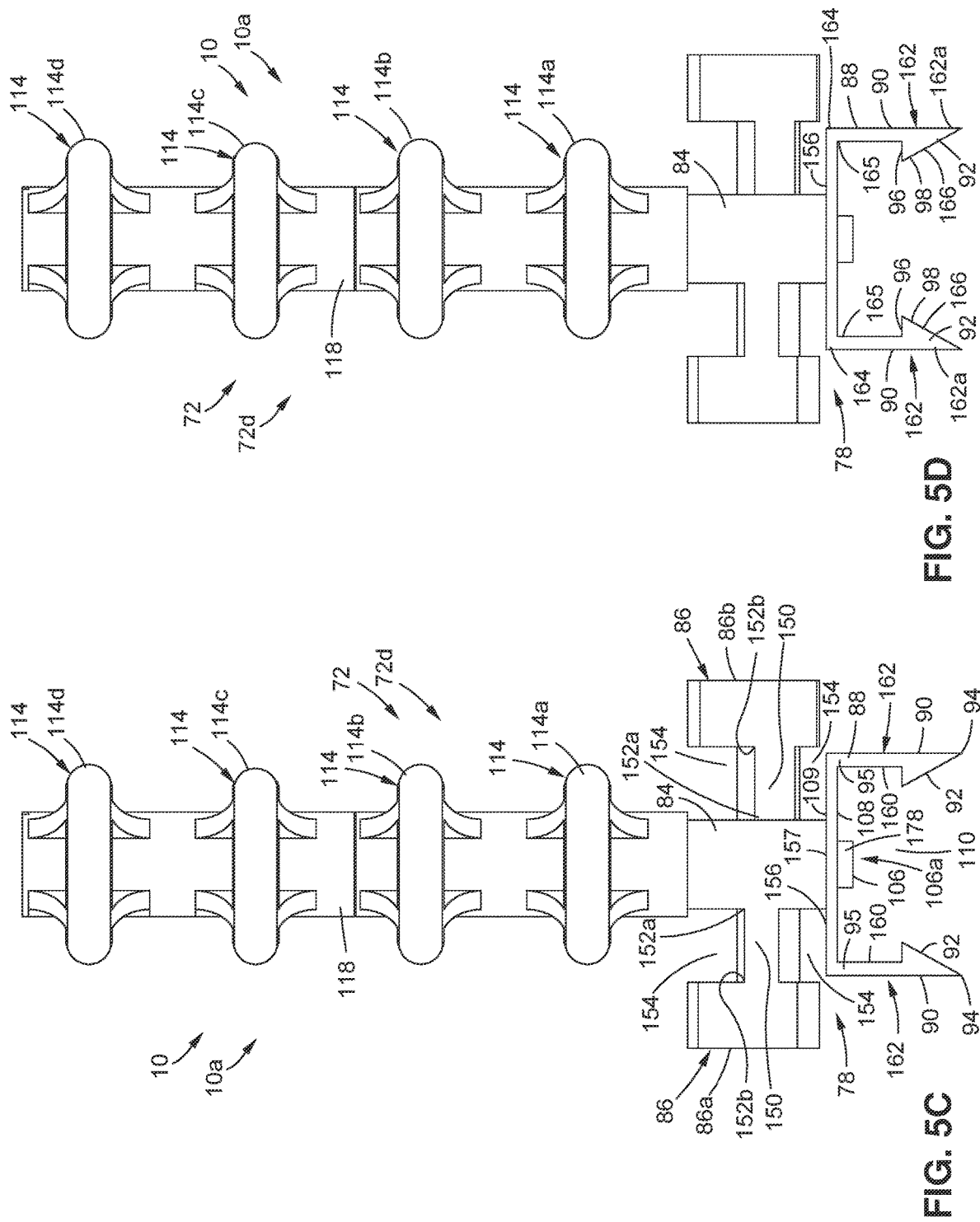

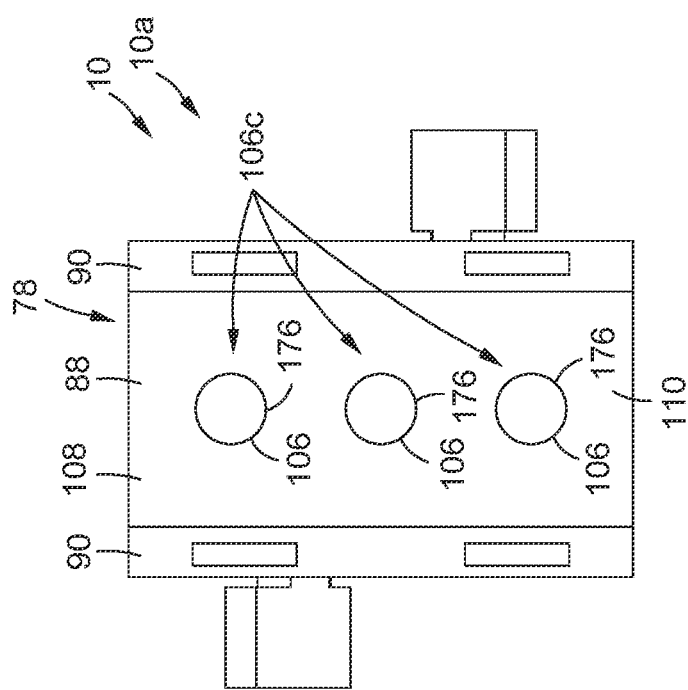
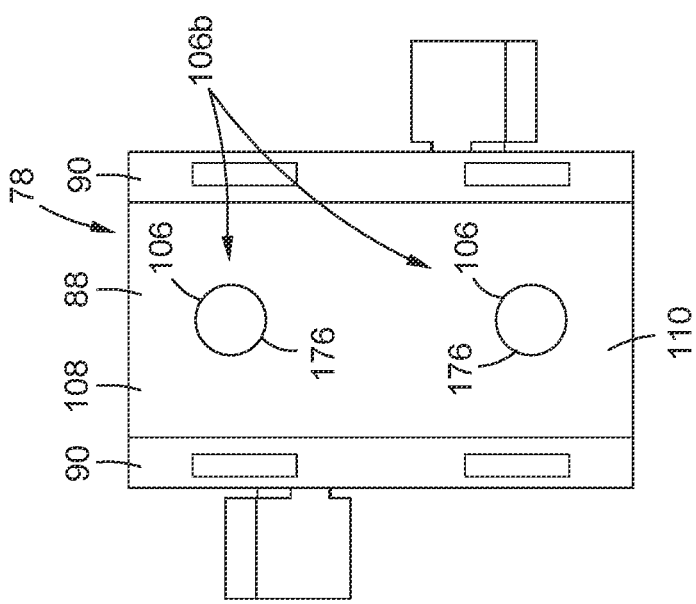

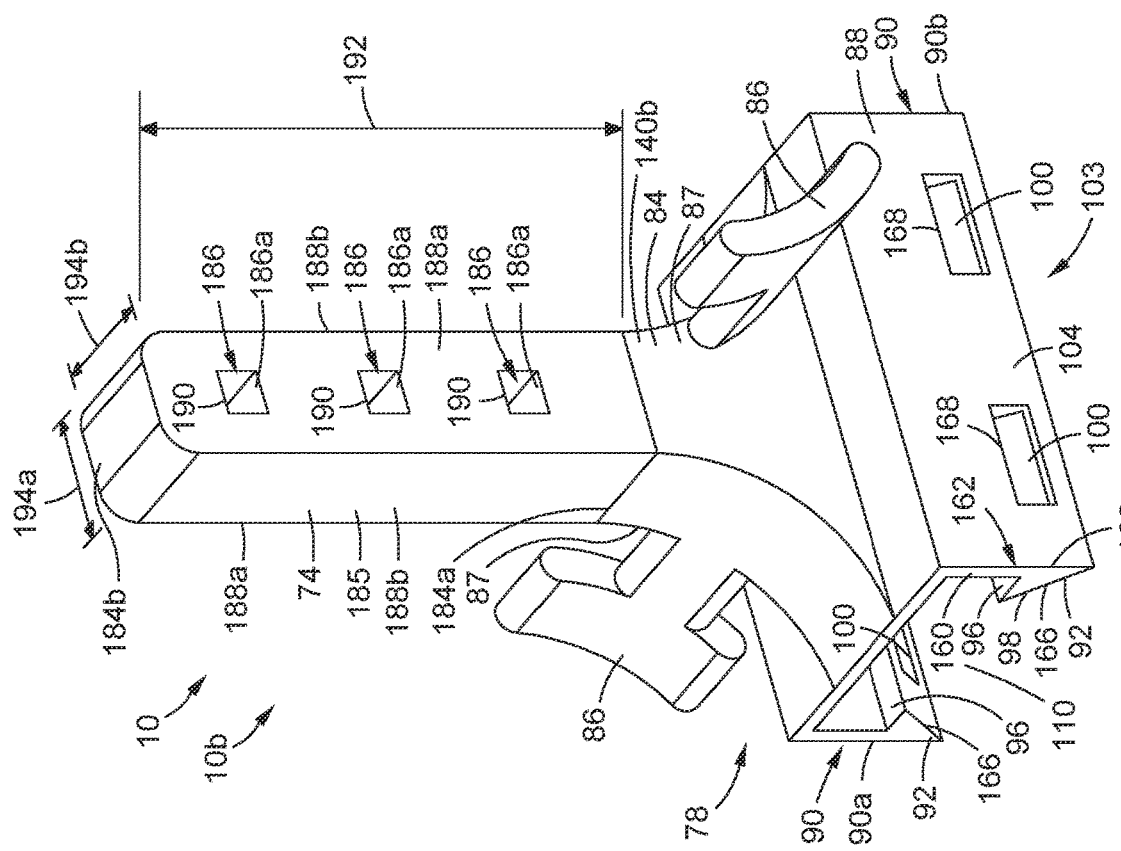
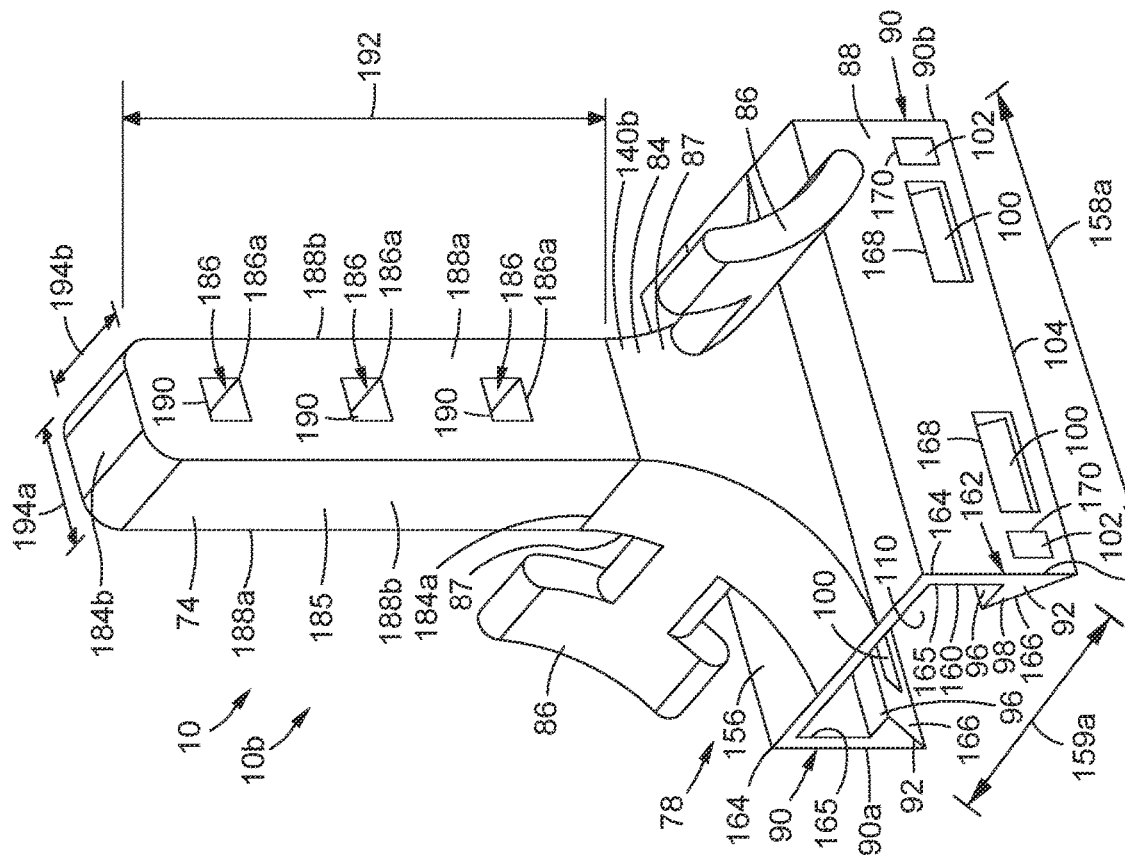

ONE-PIECE CO-MOLDED SNAP-ON APPARATUS, AND SUPPORT SYSTEM AND METHOD OF USING THE SAME

FIELD

The disclosure relates generally to apparatuses, systems, and methods for installing components for supporting elongate elements, and more specifically, to apparatuses, systems, and methods for installing components for supporting, routing, and attaching elongate elements, such as wires, and harnesses for elongate elements, in a vehicle, such as an aircraft.

BACKGROUND

In vehicles, such as aircraft, rotorcraft, spacecraft, watercraft, automobiles, and other vehicles, components, such as ring posts and monuments, may be used to support, route, and attach, elongate elements, such as wires, cables, tubes, hoses, and the like, and harnesses bundling the elongate elements, in and to the vehicle. Known ring posts typically consist of one or more rings each having radially extending spokes that define a corresponding number of through openings therebetween. Known monuments typically consist of a tower member with a post and a base extending from the post. Thousands of such ring posts and monuments are typically installed in the manufacture and use of large commercial aircraft, to hold the elongate elements or harnesses out of the way while work is being performed, or to route the elongate elements or harnesses throughout the aircraft.

One known ring post installation system and method includes installing and securing a ring post to an elongate structure, such as a spanner bar, with a fastener assembly. One type of ring post has a short threaded post designed to rotate and thread into another ring post, or through a hole in the spanner bar, and then is secured with a washer and a nut under the spanner bar. Another type of ring post is a hollow ring post that is installed with a screw that is inserted through the hollow ring post and through a hole in the spanner bar, and secured with washers and a nut on a bottom side of the spanner bar. However, manually rotating the ring posts, threadably coupling the ring posts to the spanner bar or to other ring posts, and attaching the ring posts on the bottom side of the spanner bar with fasteners, screws, washers, and/or nuts to secure the ring posts, is very time and labor intensive. Each ring post may take one minute or more to install on the spanner bar or other elongate structure. Such increased time and labor may increase the overall costs of manufacturing, may present ergonomic issues to the installers, and may present possible Foreign Object Debris (FOD) fallout from the installation. Moreover, the use of added fasteners, screws, washers, nuts, or other fastener assembly components to attach the ring posts to, and under, the spanner bar may add unwanted weight to the aircraft.

Further, numerous tools, such as drills, screwdrivers, wrenches, or other tools, may be needed to build a ring post stack-up on the spanner bar. The use of numerous tools may increase the need for tracking and/or calibration of the tools, and may increase the risk of lost tools in a manufacturing area. In addition, stacking ring posts together may require "clocking" the ring posts, which is a procedure for orienting the ring posts with respect to each other, to align the through openings of the ring posts, and to align the ring posts with respect to the spanner bar. Correctly clocking the ring posts is time and labor intensive.

In addition, known ring posts and monuments can include multiple parts, such as the ring post or monument and a separate base assembly with one or more parts. The ring post or monument and the separate base assembly are typically attached together and assembled prior to, or during, installation on the elongate structure, such as the spanner bar. Such assembly is time and labor intensive, and the assembly may take one minute or more to install on the spanner bar or other elongate structure. Such increased time and labor may increase the overall costs of manufacturing.

Accordingly, there is a need in the art for an improved apparatus, system, and method for installing ring posts, monuments, and similar support components or apparatuses for elongate elements, such as wires and the like, in a vehicle, that save installation time and labor, that are fast, easy, and efficient to install with a one-step snap-on attachment, that require no added fastener assemblies for attachment to an elongate structure, thus removing unwanted weight, that require no tools to attach or install to the elongate structure, that improve the ergonomics of installation, and that provide advantages over known apparatuses, systems, and methods.

SUMMARY

Example implementations of the present disclosure provide an assembly, system, and method for installing components or apparatuses for routing elongate elements in a vehicle. As discussed in the below detailed description, versions of the assembly, system, and method may provide significant advantages over known assemblies, systems, and methods.

In a version of the disclosure, there is provided a one-piece co-molded snap-on apparatus for supporting one or more elongate elements. The one-piece co-molded snap-on apparatus comprises a ring post and a snap-on attachment base co-molded to the ring post to form the one-piece co-molded snap-on apparatus designed for a snap-on attachment to an elongate bar structure.

The snap-on attachment base comprises a top support portion integral with the ring post. The top support portion has curved support surface elements on opposite sides of the top support portion. The snap-on attachment base further comprises a bottom attachment portion integral with the top support portion. The bottom attachment portion has side arms opposite each other and designed to snap fit against opposing sides of the elongate bar structure. Each side arm has a snap-fit edge portion formed at a bottom end of each side arm. Each snap-fit edge portion has a topmost surface designed to fit against a bottommost surface of the elongate bar structure. Each snap-fit edge portion further has a triangular shape and has at least two through openings.

The snap-on attachment base further comprises at least one centering element projecting from an interior surface of the snap-on attachment base into a channel formed between the side arms. The at least one centering element is designed to mate with at least one hole in the elongate bar structure to center the one-piece co-molded snap-on apparatus on the elongate bar structure. The one-piece co-molded snap-on apparatus supports the one or more elongate elements routed in a structure.

In another version of the disclosure, there is provided a support system for an aircraft. The support system has one or more one-piece co-molded snap-on apparatuses for supporting one or more elongate elements routed in the aircraft.

The support system comprises one or more elongate bar structures. The support system further comprises the one or more one-piece co-molded snap-on apparatuses. Each one-piece co-molded snap-on apparatus comprises a ring post and a snap-on mounting base co-molded to the ring post to form the one-piece co-molded snap-on apparatus designed for a snap-on attachment to one of the one or more elongate bar structures.

The snap-on mounting base comprises a top support portion integral with the ring post. The top support portion has curved support surface elements on opposite sides of the top support portion, and is designed to support one or more of the one or more elongate elements. The snap-on mounting base further comprises a bottom mounting portion integral with the top support portion. The bottom mounting portion has side arms opposite each other and is designed to snap fit against opposing sides of the elongate bar structure. Each side arm has a snap-fit edge portion formed at a bottom end of each side arm. Each snap-fit edge portion has a topmost surface designed to fit against a bottommost surface of one of the one or more elongate bar structures, and each snap-fit edge portion further has a triangular shape and has at least two through openings.

The snap-on attachment base further comprises at least one centering element projecting from an interior surface of the snap-on mounting base into a channel formed between the side arms. The at least one centering element is designed to mate with at least one hole in one of the one or more elongate bar structures to center each of the one-piece co-molded snap-on apparatuses on the elongate bar structure.

The support system further comprises the one or more elongate elements attached to the one or more one-piece co-molded snap-on apparatuses. The one or more one-piece co-molded snap-on apparatuses support the one or more elongate elements routed in the aircraft.

In another version of the disclosure, there is provided a method of using a one-piece co-molded snap-on apparatus to support one or more elongate elements routed in a structure. The method comprises the step of providing the one-piece co-molded snap-on apparatus.

The one-piece co-molded snap-on apparatus comprises a ring post and a snap-on attachment base co-molded to the ring post to form the one-piece co-molded snap-on apparatus. The snap-on attachment base comprises a top support portion integral with the ring post. The top support portion has curved support surface elements on opposite sides of the top support portion. The snap-on attachment base further comprises a bottom attachment portion integral with the top support portion. The bottom attachment portion has side arms opposite each other and designed to snap fit against opposing sides of an elongate bar structure. Each side arm has a snap-fit edge portion formed at a bottom end of each side arm. Each snap-fit edge portion has a topmost surface designed to fit against a bottommost surface of the elongate bar structure. Each snap-fit edge portion further has a triangular shape and has at least two through openings.

The snap-on attachment base further comprises at least one centering element projecting from an interior surface of the snap-on attachment base into a channel formed between the side arms. The at least one centering element is designed to mate with at least one hole in the elongate bar structure to center the one-piece co-molded snap-on apparatus on the elongate bar structure.

The method further comprises the step of attaching the one-piece co-molded snap-on apparatus to the elongate bar structure, via a snap-on attachment action. The method further comprises coupling the one or more elongate elements to the one-piece co-molded snap-on apparatus attached to the elongate bar structure, to support the one or more elongate elements routed in the structure.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2A is an illustration of a front right side perspective view of an exemplary version of a one-piece co-molded snap-on apparatus of the disclosure, showing a ring post with two rings co-molded to a snap-on attachment base having a bottom attachment portion with two through openings and two indentations;

FIG. 2B is an illustration of a front view of the one-piece co-molded snap-on apparatus of FIG. 2A;

FIG. 2E is an illustration of a top view of the one-piece co-molded snap-on apparatus of FIG. 2A;

FIG. 2F is an illustration of a bottom view of the one-piece co-molded snap-on apparatus of FIG. 2A, having one centering element;

FIG. 5A is an illustration of a front perspective view of an exemplary version of a one-piece co-molded snap-on apparatus of the disclosure, showing a ring post with four rings and a bottom attachment portion with two through openings and two indentations;

FIG. 5B is an illustration of a front right side perspective view of the one-piece co-molded snap-on apparatus of FIG. 5A;

FIG. 5C is an illustration of a front view of the one-piece co-molded snap-on apparatus of FIG. 5A;

FIG. 5D is an illustration of a back view of the one-piece co-molded snap-on apparatus of FIG. 5A;

FIG. 5H is an illustration of a bottom view of the one-piece co-molded snap-on apparatus of FIG. 5A, having two centering elements;

FIG. 5I is an illustration of a bottom view of the one-piece co-molded snap-on apparatus of FIG. 5A, having three centering elements;

FIG. 8A is an illustration of a right side perspective view of another exemplary version of a one-piece co-molded snap-on apparatus of the disclosure, showing a monument and a bottom attachment portion with two through openings and two indentations;

FIG. 8B is an illustration of a right side perspective view of the one-piece co-molded snap-on apparatus with the monument of FIG. 8A, showing the bottom attachment portion with two through openings and no indentations;

Figure 1:
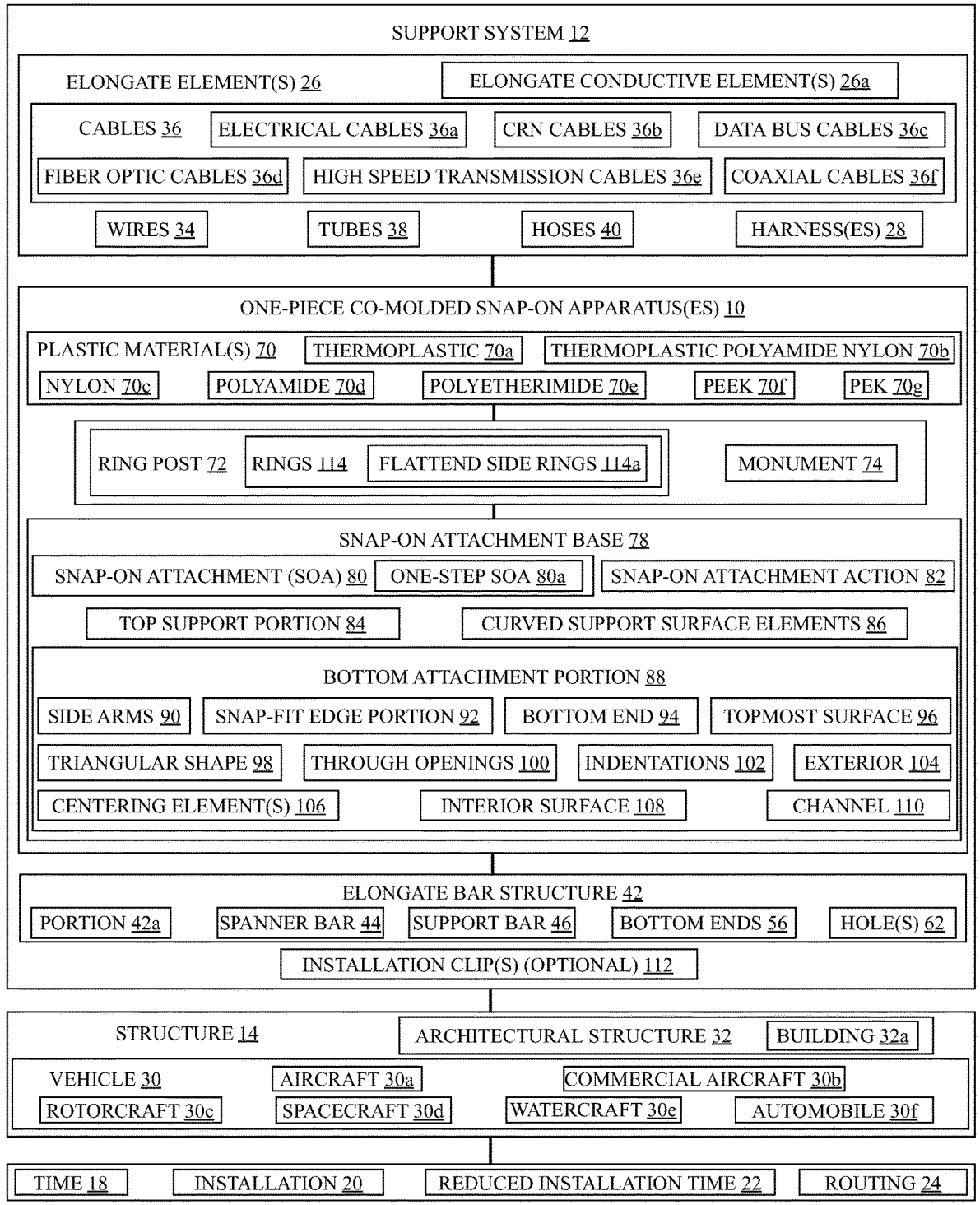
FIG. 1 is an illustration of a block diagram of an exemplary one-piece co-molded snap-on apparatus of the disclosure, implemented in an exemplary support system of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary one-piece co-molded snap-on apparatus 10 of the disclosure, implemented in an exemplary support system 12 of the disclosure in a structure 14. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the one-piece co-molded snap-on apparatus 10 and the support system 12 in the structure 14 in FIG. 1 are not meant to imply physical or architectural limitations to the manner in which an illustrative example may be implemented. Other components in addition to, or in place of, the ones illustrated may be used. Some components may be unnecessary.

As shown in FIG. 1, the one-piece co-molded snap-on apparatus 10 is made via co-molding 16. As used herein, "co-molding" means creating a single piece part from two or more parts, or two or more materials, via a process such as overmolding, injection molding, or insert molding.

As shown in FIG. 1, use of the one-piece co-molded snap-on apparatus 10 in the support system 12 reduces a time 18 of installation 20, to obtain a reduced installation time 22, for installing the co-molded snap-on support base 10 used for routing 24 one or more elongate elements 26, and also for routing 24 one or more harnesses 28 bundling, holding, and/or surrounding the elongate elements 26, in the structure 12 such as a vehicle 30, or an architectural structure 32.

As shown in FIG. 1, the support system 12 comprises one or more elongate elements 26 configured for attachment to, and attached to, the one-piece co-molded snap-on apparatus 10. The one-piece co-molded snap-on apparatus 10 supports the one or more elongate elements 26 routed in the structure 14. As shown in FIG. 1, the elongate elements 26 may comprise conductive elongate elements 26a, for example, wires 34 and cables 36. As further shown in FIG. 1, the cables 36 may comprise electrical cables 36a, current return network (CRN) cables 36b, data bus cables 36c, fiber optic cables 36d, high speed transmission cables 36e, coaxial cables 36f, or other types of cables. The elongate elements 26 may also comprise tubes 38 (see FIG. 1), hoses 40 (see FIG. 1), or other suitable elongate elements. The various elongate elements 26 secured by the support system 12 have varying diameters.

The support system 12 with the one-piece co-molded snap-on apparatus 10 is used to route, support, and attach the elongate elements 26, and harnesses 28 bundling, holding, and/or surrounding, the elongate elements 26, during the manufacture of the vehicle 30 and/or when the vehicle 30 is in use. As used herein, a "harness" means an assembly of elongate elements, such as wires or cables, bundled, held, surrounded, or bound by a durable material, or sleeve of durable material, such as rubber, vinyl, electrical tape, conduit, or another suitable durable material. The sleeve my be fire retardant. By bundling or binding multiple elongate elements 26, such as wires 34 and cables 36, into a harness 28, the elongate elements 26 may be secured against the adverse effects of vibrations, abrasions, and moisture, and by constricting the elongate elements 26 into a bundle, usage of space is optimized. Further, if an installer has only one harness to install, instead of multiple elongate elements 26, such as wires 34 and cables 36, installation time may be reduced.

As shown in FIG. 1, the vehicle 30 may comprise an aircraft 30a (see also FIG. 13), such as a commercial aircraft 30b, a rotorcraft 30c, a spacecraft 30d, a watercraft 30e, or an automobile 30f. The vehicle 30 may also comprise another suitable vehicle routing elongate elements 26 and harnesses 28 during manufacture and/or use. The support system 12 with the one-piece co-molded snap-on apparatus 10 is also used to route, support, and attach the elongate elements 26, and the harnesses 28 bundling, holding, and/or surrounding, the elongate elements 26, in non-vehicular settings, including architectural structures 32 (see FIG. 1), such as buildings 32a (see FIG. 1), including offices, homes, warehouses, or other suitable architectural structures, and particularly when elongate elements 26 of differing diameters extend along a common path.

As shown in FIG. 1, the support system 12 further comprises an elongate bar structure 42 comprising a spanner bar 44, a support bar 46, or another suitable elongate bar structure, on which the one-piece co-molded snap-on apparatus 10 is installed and attached to. Each one-piece co-molded snap-on apparatus 10 is installed and directly attached to a portion 42a (see FIG. 1) of the elongate bar structure 42, such as the spanner bar 44.

Figure 9A:
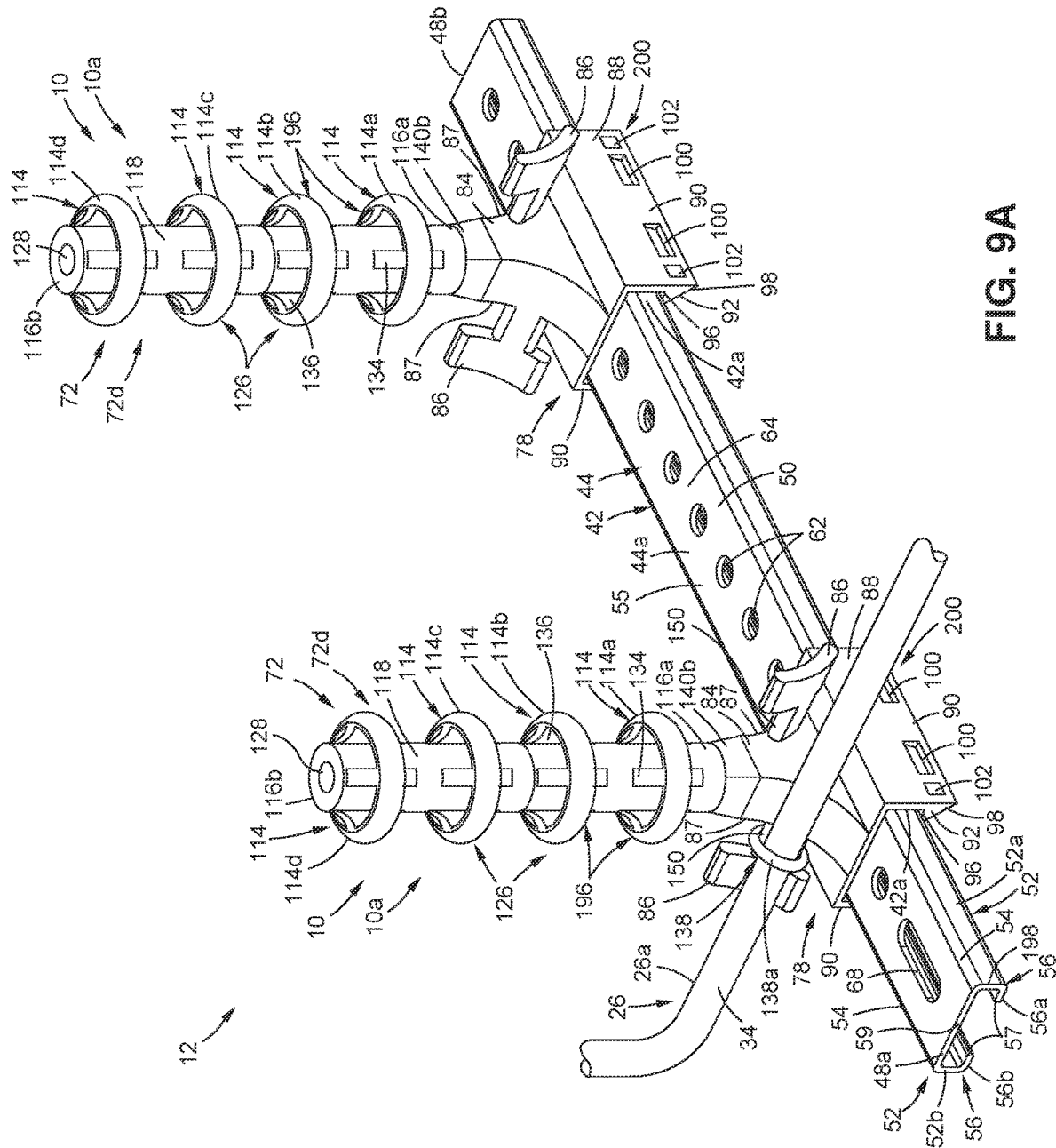
FIG. 9A is an illustration of a right side perspective view of an exemplary version of a support system of the disclosure, showing one-piece co-molded snap-on apparatuses installed on an elongate bar structure.

In one version, as shown in FIG. 9A, the elongate bar structure 42, such as in the form of the spanner bar 44, comprises a first end 48a, a second end 48b, an elongate body 50 formed between the first end 48a and the second end 48b, and opposing sides 52, such as a first side 52a and a second side 52b, that depend downwardly from top edges 54 of the elongate body 50. The elongate bar structure 42, such as in the form of the spanner bar 44, further comprises a top end 55 (see FIG. 9A) and comprises bottom ends 56 (see FIGS. 1, 9A), such as a first bottom end 56a (see FIG. 9A) and a second bottom end 56b (see FIG. 9A), integral with, and perpendicular to, the first side 52a and the second side 52b, respectively. The bottom ends 56 comprise a bottommost surface 56c. The elongate bar structure 42, such as in the form of the spanner bar 44, further comprises an edge surface 57 (see FIG. 9A) depending upwardly from each bottom end 56 and facing into an interior channel 58 (see FIGS. 9B) formed between the edge surfaces 57 and formed in the interior space of the elongate bar structure 42, such as the spanner bar 44, surrounded by the top end 55, the opposing sides 52, and the bottom ends 56. The one-piece co-molded snap-on apparatus 10 is attached with a snap-on attachment action 60 (see FIG. 1), such as a one-step snap-on attachment action 60a (see FIG. 1), over the top end 55, the opposing sides 52, the bottom ends 56, and the edge surfaces 57 of the portion 42a of the elongate bar structure 42, such as the spanner bar 44, to which the one-piece co-molded snap-on apparatus 10 is attached. The top end 55, opposing sides 52, and bottom ends 56 of the elongate bar structure 42, such as the spanner bar 44, form a bracket 59 (see FIG. 9B) having a generally C-shaped configuration 61 (see FIG. 9A). However, the elongate bar structure 42, such as the spanner bar 44, can have other suitable shapes and sizes, including polygonal, round, elliptical, and the like. The elongate bar structure 42, such as the spanner bar 44, may also form a hollow elongate structure or may be primarily solid depending on the application.

The elongate bar structure 42, such as the spanner bar 44, has a plurality of holes 62 (see FIGS. 1, 9A, 10, 11), such as through holes, that define registration points 63 (see FIGS. 9A, 10, 11) formed through a central portion 64 (see FIG. 9A) of the elongate body 50, along a length 66 (see FIG. 9B) of the elongate bar structure 42, such as the spanner bar 44. Preferably, the holes 62 are spaced an equal distance apart from each other along the length 66. In one version, the elongate bar structure 42, such as the spanner bar 44, is about 18 (eighteen) inches long, although the length 66 of the elongate bar structure 42, such as the spanner bar 44, can vary from a few inches to several feet or more depending upon the application. In addition, the elongate bar structure 42, such as the spanner bar 44, may be linear as shown, but may have other, non-linear configurations if so desired.

Figure 10:
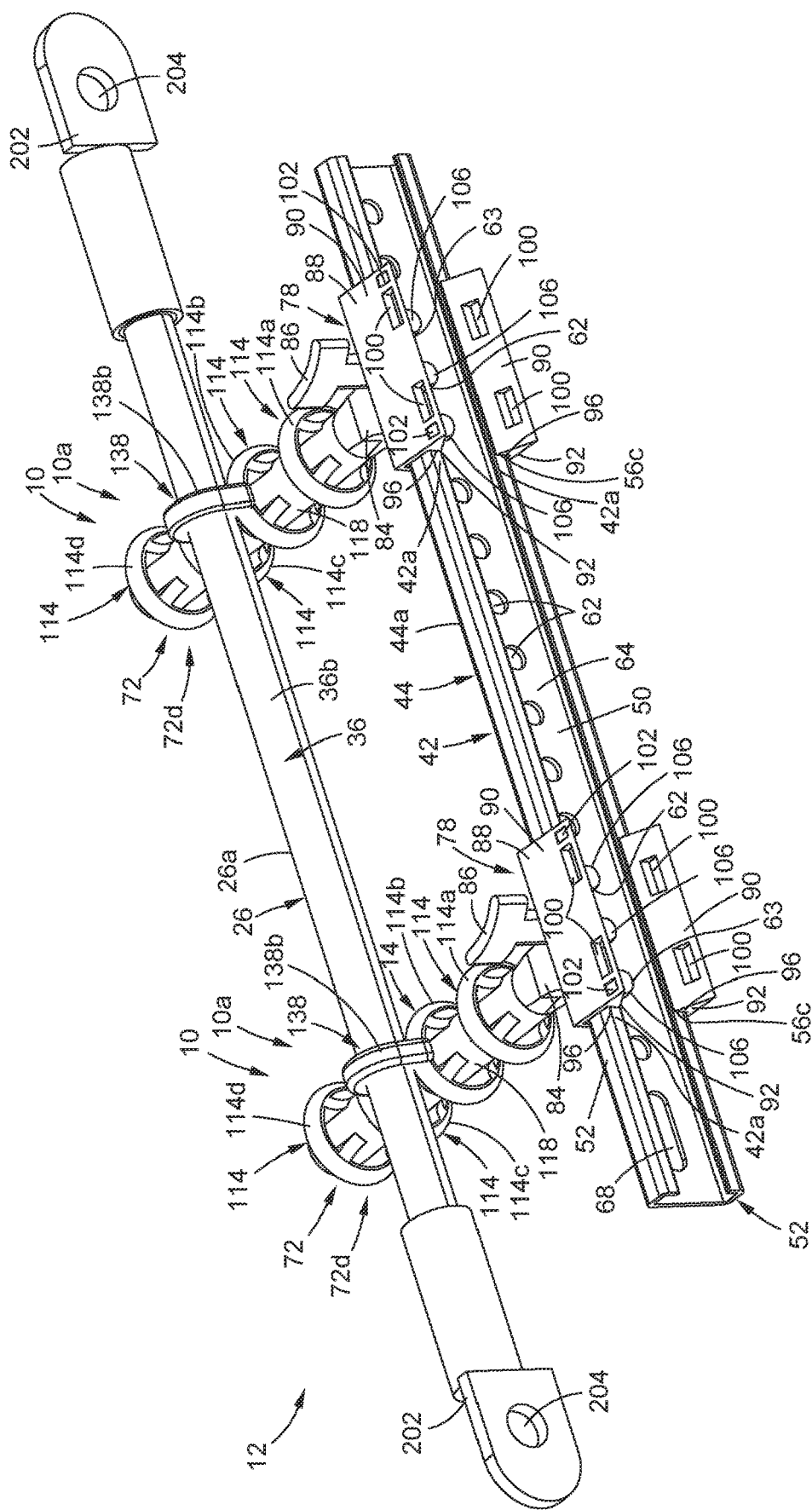
FIG. 10 is an illustration of a bottom right side perspective view of an exemplary version of a support system of the disclosure, showing the one-piece co-molded snap-on apparatuses installed on an elongate bar structure.

As shown in FIGS. 9A, 10, the elongate bar structure 42, such as the spanner bar 44, has a slot opening 68 formed through the central portion 64 of the elongate body 50, at, or near, the first end 48a of the elongate bar structure 42, such as the spanner bar 44. The slot opening 68 is designed to receive a fastener (not shown), such as a screw, bolt, or other suitable fastener, to fasten the elongate bar structure 42, such as the spanner bar 44, to the interior of the vehicle 30, for example, the aircraft 30a, or to another structure in the vehicle 30, or to an architectural structure 32. The slot opening 68 allows for positional tolerances between the elongate bar structure 42, such as the spanner bar 44, and the attachment points in the interior of the vehicle 30, for example, the aircraft 30a, or on another structure in the vehicle 30, or on an architectural structure 32. The one-piece co-molded snap-on apparatus 10 is designed for insertion through one hole 62, two holes 62, or three holes 62 in the portion 42a of the elongate bar structure 42, such as the spanner bar 44, on which the one-piece co-molded snap-on apparatus 10 is attached.

The elongate bar structure 42, such as the spanner bar 44, may be made of a metal material, such as aluminum, steel, stainless steel, plated steel, titanium, or a combination of one or more thereof. However, any material capable of supporting the associated loads of the elongate elements 26 and harnesses 28 for the elongate elements 26, may be used, including but not limited to, metals and alloys thereof, composites, such as plastic, polymer, nylon, ceramic, or another suitable composite material, and combinations of one or more thereof.

As shown in FIG. 1, the one-piece co-molded snap-on apparatus 10 is made of one or more plastic materials 70, comprising thermoplastic 70a, thermoplastic polyamide nylon 70b, nylon 70c, polyamide 70d, polyetherimide 70e, polyetheretherketone (PEEK) 70f, polyetherketone (PEK) 70g, or another suitable plastic material. The one-piece co-molded snap-on apparatus 10 may be made of one or more of these plastic materials 70 and used in vehicles 30, such as aircraft 30a, or used in other vehicles 30 and architectural structures 32.

As shown in FIG. 1, the one-piece co-molded snap-on apparatus 10 for supporting one or more elongate elements 26 of the support system 12 comprises a ring post 72 or a monument 74. In various versions, the ring post 72 comprises, a 1-ring ring post 72a (see FIG. 3) having 1 (one) ring 114, a 2-ring ring post 72b (see FIG. 2A) having 2 (two) rings 114, a 3-ring ring post 72c (see FIG. 4) having 3 (three) rings 114, a 4-ring ring post 72d (see FIG. 5A) having 4 (four) rings 114, a 5-ring ring post 72e (see FIG. 6) having 5 (five) rings 114, or a 6-ring ring post 72f (see FIG. 7) having 6 (six) rings 114. Each ring post 72 comprises one or more rings 114.

The ring post 72 of the one-piece co-molded snap-on apparatus 10 and the monument 74 of the one-piece co-molded snap-on apparatus 10 are made of one or more plastic materials 70, comprising thermoplastic 70a, thermoplastic polyamide nylon 70b, nylon 70c, polyamide 70d, polyetherimide 70e, polyetheretherketone (PEEK) 70f, polyetherketone (PEK) 70g, or another suitable plastic material. The ring post 72 of the one-piece co-molded snap-on apparatus 10 and the monument 74 of the one-piece co-molded snap-on apparatus 10 may be made of one or more of these plastic materials 70 and used in vehicles 30, such as aircraft 30a, or used in other vehicles 30 and architectural structures 32. Metal materials, as discussed below, may be used to make an insert 76 (see FIG. 2I), such as a metal rod insert 76a (see FIG. 2I), inserted in the ring posts 72, to provide added reinforcement.

The ring posts 72 may vary in length depending on a number of rings 114 (see FIG. 1) and height desired, and the ring post 72 or stack-up of ring posts 72 generally has a length in a range of 0.73 inch to 4.62 inches. For example, in one version, one ring post 72, such as a 1-ring ring post 72a (see FIG. 3) may have a length of 0.75 inch+/−0.02 inch, and in one version, a stack-up of 6 (six) ring posts 72, such as six 1-ring ring posts 72a, may have a length of 4.5 inches.

The ring post 72 is discussed in further detail below with respect to FIGS. 2A-7. The monument 74 is discussed in further detail below with respect to FIGS. 8A-8B.

As shown in FIG. 1, the one-piece co-molded snap-on apparatus 10 for supporting one or more elongate elements 26 of the support system 12 further comprises a snap-on attachment base 78 co-molded to the ring post 72 or co-molded to the monument 74, to form the one-piece co-molded snap-on apparatus 10 designed for a snap-on attachment (SOA) 80, such as a one-step snap-on attachment (SOA) 80a, to an elongate bar structure 42 using a snap-on attachment action 82. The snap-on attachment 80, such as a one-step snap-on attachment 80a, is performed using a snap-on attachment action 82 (see FIG. 1).

As shown in FIG. 1, the snap-on attachment base 78 comprises a top support portion 84 co-molded with, and integral with, the ring post 72, or co-molded with, and integral with, the monument 74. The top support portion 84 has curved support surface elements 86 (see FIGS. 1, 2A) on opposite sides 87 (see FIG. 2A) of the top support portion 84. The curved support surface elements 86 are designed to support the elongate elements 26, and/or to support the harnesses 28 bundling, holding, and/or surrounding, the elongate elements 26. The curved support surface elements 86 are discussed in further detail below with respect to FIG. 2A.

As shown in FIG. 1, the snap-on attachment base 78 further comprises a bottom attachment portion 88 integral with the top support portion 84. As further shown in FIG. 1, the bottom attachment portion 88 has side arms 90, or side walls, such as a first side arm 90a, or first side wall, and a second side arm 90b, or second side wall, opposite each other and designed to snap fit against opposing sides 52 of the elongate bar structure 42. Each side arm 90, or side wall, has a snap-fit edge portion 92 (see FIG. 1) formed at a bottom end 94 (see FIG. 1) of each side arm 90. Each snap-fit edge portion 92 (see FIG. 1) has a topmost surface 96 designed to fit against a bottommost surface 56c of the elongate bar structure 42, and each snap-fit edge portion 92 further has a triangular shape 98 (see FIG. 1) and has at least two through openings 100 (see FIG. 1) formed through each side arm 90. As shown in FIG. 1, each side arm 90 may further comprise at least two indentations 102 formed on an exterior 104 of the snap-fit edge portion 92 of each side arm 90.

The snap-on attachment base 78 of the one-piece co-molded snap-on apparatus 10 is co-molded with, and integral with, the ring post 72, or co-molded with, and integral with, the monument 74, and is configured for attachment to, and is attached to, the portion 42a of the elongate bar structure 42, such as the spanner bar 44, without the use of tools or fasteners, screws, washers, and nuts to secure to facilitate attachment of the ring post 72 to the elongate bar structure 42, such as the spanner bar 44.

As shown in FIG. 1, the snap-on attachment base 78 further comprises at least one centering element 106 projecting from an interior surface 108 of the bottom attachment portion 88 of the snap-on attachment base 78 into a channel 110 formed between the side arms 90. The at least one centering element 106 is designed to mate with at least one hole 62 in the elongate bar structure 42 to center the one-piece co-molded snap-on apparatus 10 on the elongate bar structure 42. The at least one centering element 106 may comprise one centering element 106 for a one centering element configuration 106a (see FIG. 2F), two centering elements 106 for a two centering elements configuration 106b (see FIG. 2G), three centering elements 106 for a three centering elements configuration 106c (see FIG. 2H), or another suitable number of centering elements 106 projecting from the interior surface 108 of the snap-on attachment base 78.

As shown in FIG. 1, the support system 12 may further optionally comprise one or more installation clips 112, each designed for insertion through the at least two through openings 100 of the snap-fit edge portion 92 of each side arm 90. The installation clip 112 may comprise a J-clip 112a (see FIG. 11), or another suitable type of installation clip.

Figure 2D:
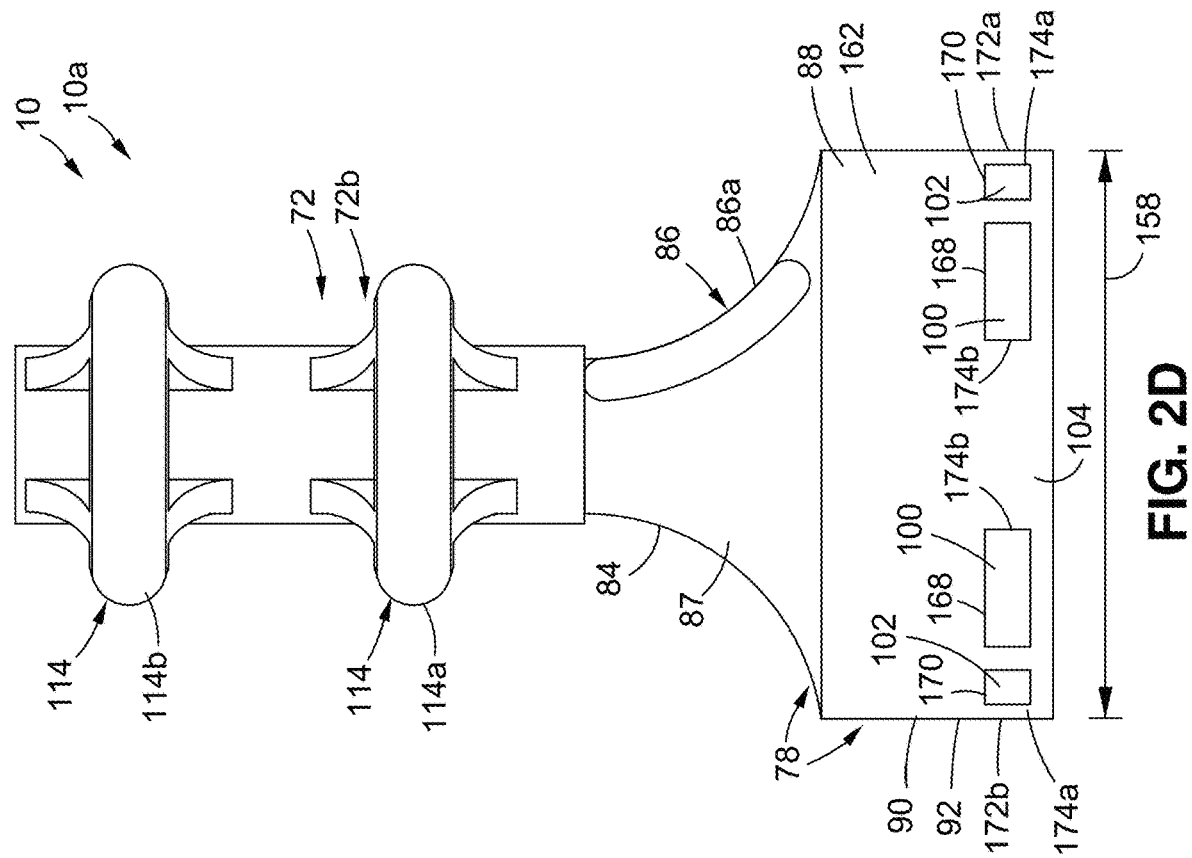
FIG. 2D is an illustration of a left side view of the one-piece co-molded snap-on apparatus of FIG. 2A.
Figure 2C:
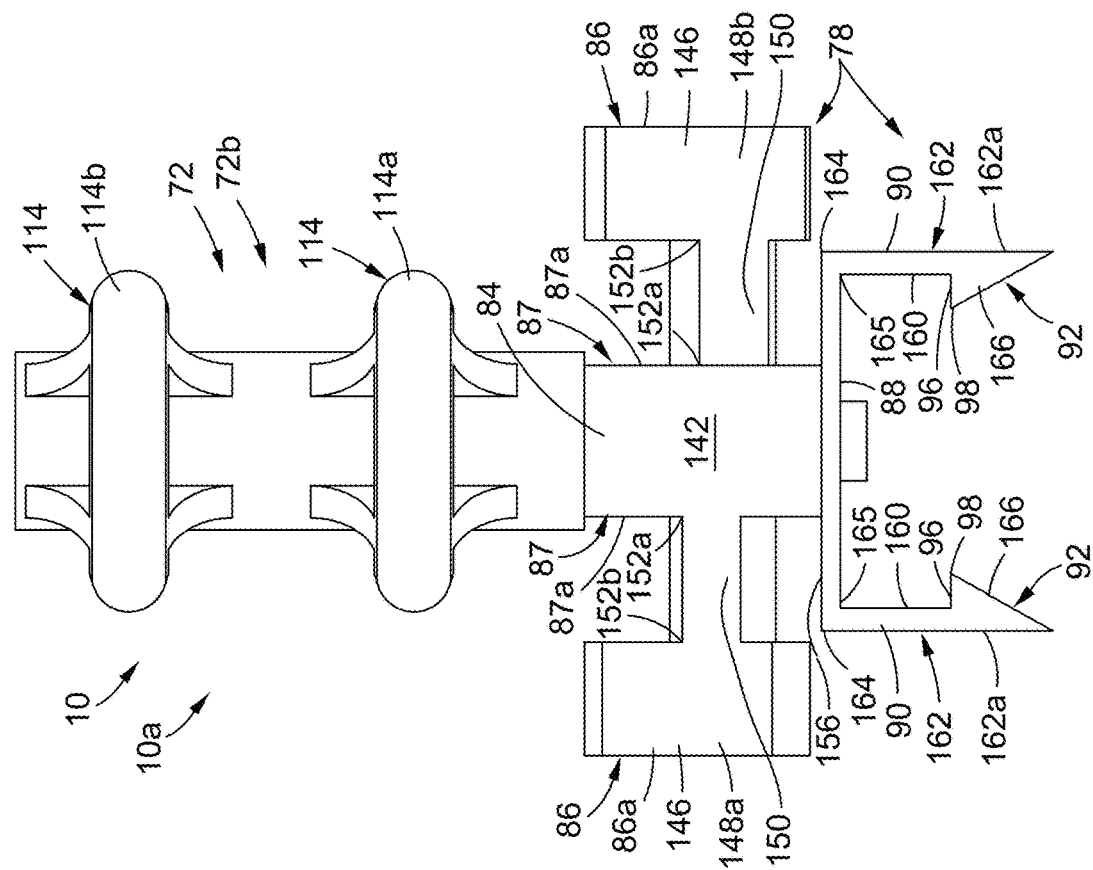
FIG. 2C is an illustration of a back view of the one-piece co-molded snap-on apparatus of FIG. 2A.
Figure 2H:
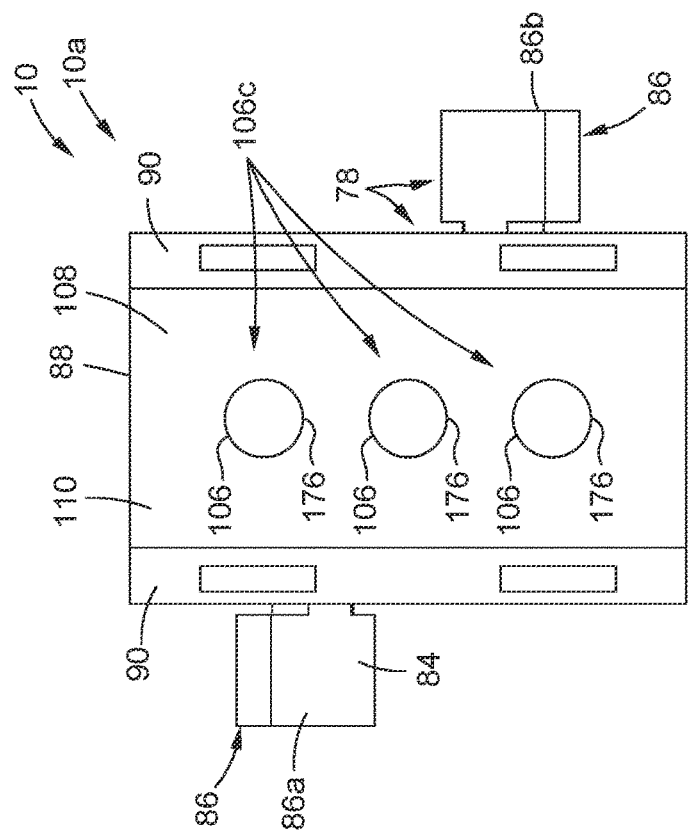
FIG. 2H is an illustration of a bottom view of the one-piece co-molded snap-on apparatus of FIG. 2A, having three centering elements.
Figure 2G:
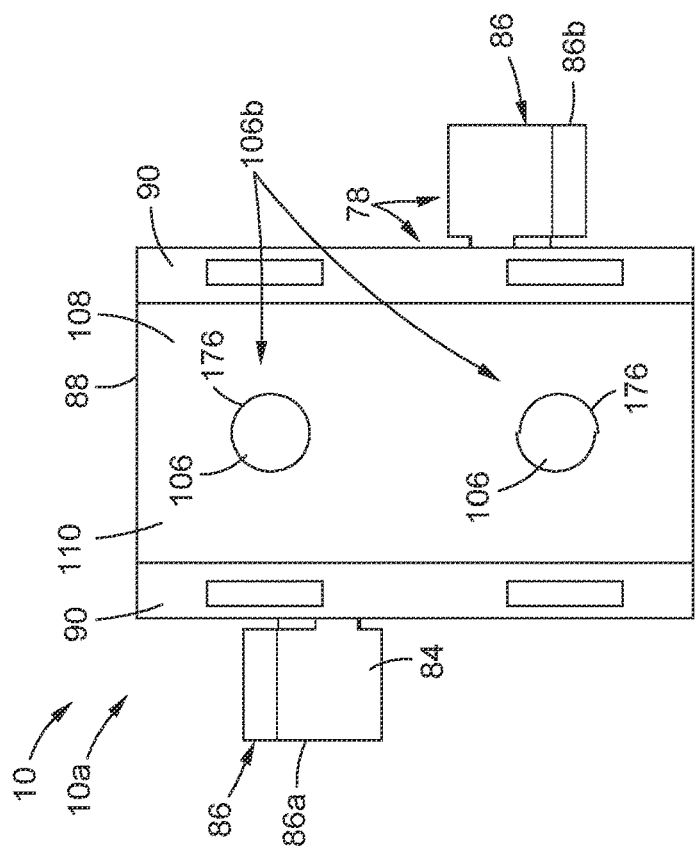
FIG. 2G is an illustration of a bottom view of the one-piece co-molded snap-on apparatus of FIG. 2A, having two centering elements.

Now referring to FIGS. 2A-2J, FIGS. 2A-2J show versions of the one-piece co-molded snap-on apparatus 10, such as a one-piece co-molded snap-on apparatus 10a, of the disclosure, having a ring post 72, such as in the form of a 2-ring ring post 72b, with two rings 114, including a first ring 114a and a second ring 114b. FIG. 2A is an illustration of a front right side perspective view of an exemplary version of the one-piece co-molded snap-on apparatus 10 of the disclosure, showing the ring post 72, such as in the form of the 2-ring ring post 72b, with two rings 114 co-molded to, and integral to, the snap-on attachment base 78 having the top support portion 84 integral with the bottom attachment portion 88, where the bottom attachment portion 88 has two through openings 100 and two indentations 102. FIG. 2B is an illustration of a front view of the one-piece co-molded snap-on apparatus 10 of FIG. 2A. FIG. 2C is an illustration of a back view of the one-piece co-molded snap-on apparatus 10 of FIG. 2A. FIG. 2D is an illustration of a left side view of the one-piece co-molded snap-on apparatus 10 of FIG. 2A. FIG. 2E is an illustration of a top view of the one-piece co-molded snap-on apparatus 10 of FIG. 2A. FIG. 2F is an illustration of a bottom view of the one-piece co-molded snap-on apparatus 10 of FIG. 2A, having one centering element 106. FIG. 2G is an illustration of a bottom view of the one-piece co-molded snap-on apparatus 10 of FIG. 2A, having two centering elements 106. FIG. 2H is an illustration of a bottom view of the one-piece co-molded snap-on apparatus 10 of FIG. 2A, having three centering elements 106.

Figure 2I:
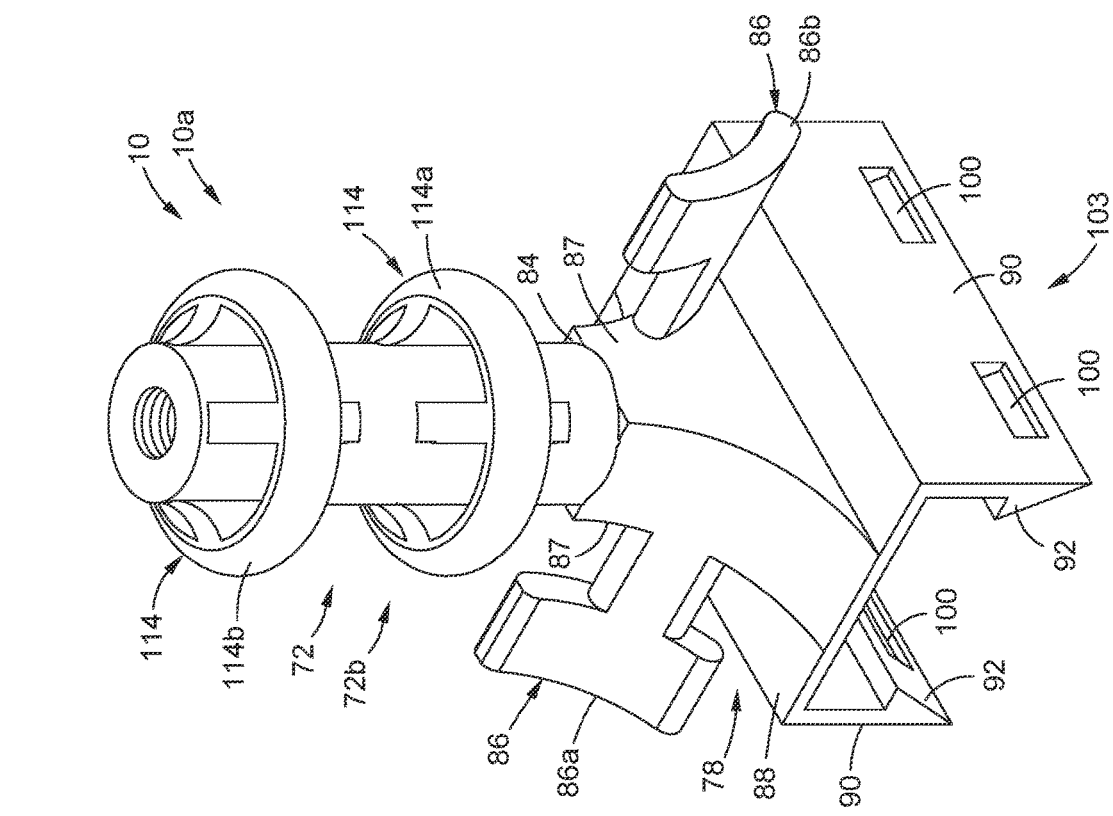
FIG. 2I is an illustration of a front right side perspective view of an exemplary version of a one-piece co-molded snap-on apparatus of the disclosure, showing a ring post with two rings, and having a metal rod insert disposed in an interior of the ring post.
Figure 2J:
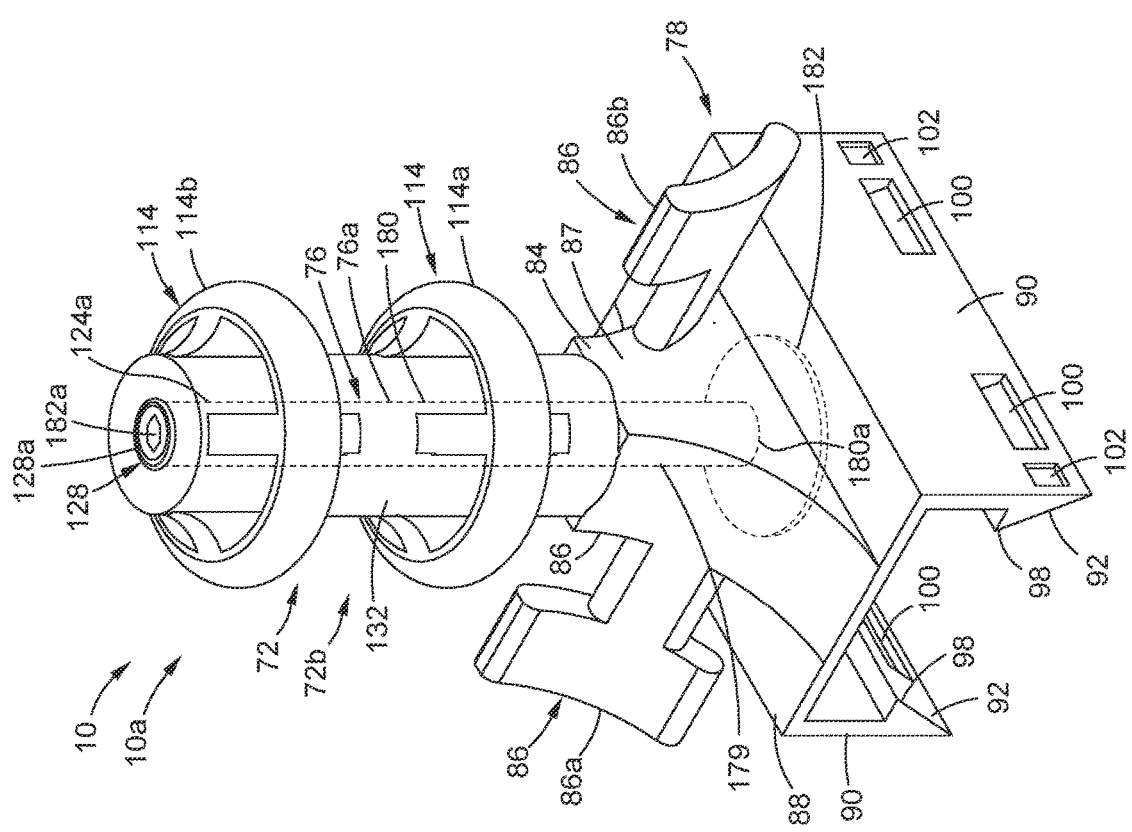
FIG. 2J is an illustration of a front right side perspective view of an exemplary version of a one-piece co-molded snap-on apparatus of the disclosure, showing a ring post with two rings co-molded to a snap-on attachment base having a bottom attachment portion with two through openings and no indentations.

FIG. 2I is an illustration of a front right side perspective view of an exemplary version of a one-piece co-molded snap-on apparatus 10 of the disclosure, showing the ring post 72, such as in the form of the 2-ring ring post 72b, with two rings 114, and having an insert 76, such as a metal rod insert 76a. FIG. 2J is an illustration of a front right side perspective view of an exemplary version of a one-piece co-molded snap-on apparatus 10 of the disclosure, showing the ring post 72, such as in the form of the 2-ring ring post 72b, with two rings 114, co-molded to, and integral with, the snap-on attachment base 78 having the top support portion 84 integral with the bottom attachment portion 88 with two through openings 100 and no indentations 102 for a no indentation version 103.

FIGS. 2A-2J show the one-piece co-molded snap-on apparatus 10 comprising the ring post 72, such as in the form of the 2-ring ring post 72b, with two rings 114, such as the first ring 114a and the second ring 114b, co-molded to, and integral to, the snap-on attachment base 78. As further shown in FIGS. 2A-2J, the snap-on attachment base 78 comprises the top support portion 84 integral with and co-molded with the ring post 72, and the top support portion 84 has curved support surface elements 86, such as a first curved support surface element 86a and a second curved support surface element 86b, on opposite sides 87 of the top support portion 84. As shown in FIGS. 2A-2J, the snap-on attachment base 78 further comprises the bottom attachment portion 88 integral with the top support portion 84.

As shown in FIG. 2A, the ring post 72 has a first end 116a, such as a bottom end, a second end 116b, such as a top end, and a ring post body 118, such as a shaft 118a, formed between the first end 116a and the second end 116b. As shown in FIG. 2A, the ring post body 118, such as the shaft 118a, has a generally cylindrical shape 120 with an exterior 122 and an interior 124.

As shown in FIG. 2A, the rings 114, such as the first ring 114a and the second ring 114b, of the ring post 72 are tiered in a tiered alignment 126 with each other, and spaced apart from each other, along the length of the ring post body 118, such as the shaft 118a. As further shown in FIG. 2A, the second end 116b, such as the top end, has an opening 128. In one version, as shown in FIG. 2A, the opening 128 comprises a threaded opening 128a. One or more additional ring posts 72 may be added to the ring post 72 co-molded with the snap-on attachment base 78 by inserting a threaded post of an added ring post into the opening 128, such as the threaded opening 128a, in the second end 116b, such as the top end, of the ring post 72, to form a stack-up of ring posts 72.

As shown in FIG. 2E, the ring 114, such as the second ring 114b, has an inner circumference 130a, an outer circumference 130b, and a ring body 132. As shown in FIGS. 2A, 2E, each ring 114 is integral with, and spaced from, the ring post body 118, such as the shaft 118a, via spokes 134, such as radially extending spokes 134a, positioned between portions of the exterior 122 of the ring post body 118, and the ring body 132. Each ring 114 is integral with, and secured to, portions of the exterior 122 of the ring post body 118, via the spokes 134 that radially extend from the ring post body 118. As shown in FIG. 2E, the spokes 134 are spaced with respect to each other at 90 degree angles and define a corresponding number of through openings 136, or slots, between the spokes 134. The ring post 72 comprises one or more rings 114 each having one or more spokes 134, such as radially extending spokes 134a, that define a corresponding number of through openings 136, or slots, therebetween. The spokes 134 separate the through openings 136 or slots. Similar to a clock face, the four (4) spokes 134 shown in FIG. 2E are generally at the positions of 12 o'clock, 3 o'clock, 6 o'clock, and 9 o'clock.

The plurality of through openings 136, or slots, are of a sufficient size to receive a fastener device 138 (see FIG. 10), such as a cable tie 138b (see FIG. 10), or another suitable fastener or attachment device. As shown in FIG. 2E, the ring 114 has 4 (four) spokes 134 and 4 (four) through openings 136. However the ring 114 may have another suitable number of spokes and corresponding through openings. When the ring post 72 has two or more rings 114, the spokes 134 and through openings 136 of each ring 114 are aligned with the spokes 134 and through openings 136 of the other rings 114 on the ring post body 118, such as the shaft 118a, and the rings 114 are tiered in the tiered alignment 126 (see FIG. 2A) with each other and, in use, are in alignment with the elongate bar structure 42 (see FIG. 9A), such as the spanner bar 44 (see FIG. 9A).

In one version, the ring post 72 may have one or more rings 114 (see FIG. 1) comprising flattened side rings 115 (see FIG. 1), where each flattened side ring 115 has one or more flat side portions that have been flattened to decrease or prevent wear on the elongate elements 26 (see FIGS. 1, 10), such as elongate conductive elements 26a (see FIGS. 1, 10), for example, cables 36 (see FIGS. 1, 10) or wires 34 (see FIG. 1), adjacent the ring 114, such as the flattened side ring 115. By flattening edges of the ring body 132 (see FIG. 2A) of the ring 114, such as the flattened side ring 115, it provides a smooth surface for the elongate elements 26, such as elongate conductive elements 26a, for example, cables 36 or wires 34, to rest on so there is less, or no, wearing away or abrasion of insulation covering the cables 36 or wires 34. Flattening the edges also provides a flatter surface on which to attach a fastener device 138 (see FIG. 10), when attaching a harness 28 (see FIG. 1) of cables 36 or wires 34 to the ring 114, such as the flattened side ring 115, with the fastener device 138. Instead of the ring 114 being round, in this version, the ring 114 has a substantially square configuration with rounded corners.

As shown in FIG. 2A, the snap-on attachment base 78 comprises the top support portion 84 having a first end 140a, or bottom end, a second end 140b, or top end, and a body 142 formed between the first end 140a and the second end 140b. The second end 140b of the top support portion 84 is co-molded with, and integral with, the first end 116a, or bottom end, of the ring post 72. The body 142 of the top support portion 84 comprises opposite sides 87, such as straight sides 87a, and curved sides 144 in between the straight sides 87a. In one version, the top support portion 84 preferably has a height in a range of 0.5 inch to 1.25 inches, and more preferably has a height of 0.75 inch+/−0.02 inch.

As shown in FIGS. 2A, 2C, the top support portion 84 has two (2) curved support surface elements 86 extending on the opposite sides 87, such as the straight sides 87a, of the top support portion 84. As shown in FIGS. 2A, 2C, the curved support surface elements 86 comprise the first curved support surface element 86a and the second curved support surface element 86b, integrally formed with the top support portion 84, and extending away from, or outwardly from, the opposite sides 87 comprising the straight sides 87a of the top support portion 84. The curved support surface elements 86 are designed to support the elongate elements 26 (see FIGS. 1, 9A), and/or to support the harnesses 28 (see FIG. 1) bundling, holding, and/or surrounding, the elongate elements 26.

As shown in FIGS. 2A, 2C, each curved support surface element 86 comprises a curved support 146 having a curved support surface side 148a, or contact side, and a back side 148b, or non-contact side. The curved support surface side 148a of the curved support 146 has a curved shape similar to the curved sides 144 (see FIG. 2A) of the top support portion 84, so that an elongate element 26 (see FIG. 9A), such as a wire 34 (see FIG. 9A) or cable 36 (see FIG. 10), such as an electrical cable (see FIG. 10), is supported on the curved support surface side 148a of the curved support 146 and one of the curved sides 144 of the top support portion 84, when coupled to the one-piece co-molded snap-on apparatus 10.

Each of the curved support surface elements 86, such as the first curved support surface element 86a and the second curved support surface element 86b, further comprises an extender arm 150 (see FIGS. 2A-2C), each having a first end 152a (see FIG. 2C) integral with the body 142 of the top support portion 84, and extending outwardly from the straight sides 87a of the top support portion 84, and each having a second end 152b (see FIG. 2E) integral with the curved support 146. Each extender arm 150 defines recess portions 154 (see FIG. 2B) formed above and below each extender arm 150, and formed between the curved support 146 and the straight side 87a of the top support portion 84.

As shown in FIGS. 2A-2B, the snap-on attachment base 78 further comprises the bottom attachment portion 88 integral with, and co-molded with, the top support portion 84. As further shown in FIGS. 2A-2B, the bottom attachment portion 88 of the snap-on attachment base 78 has the interior surface 108 and an exterior surface 109, and has a top platform end 156 having a substantially flat surface 157 (see FIGS. 2A, 2B). The bottom attachment portion 88 preferably has a length 158 (see FIG. 2D) in a range of 1.0 inch to 5.0 inches, and more preferably has a length 158 of 1.5 inches+/−0.03 inch, and the bottom attachment portion 88 preferably has a width 159 (see FIG. 2E) in a range of 0.5 inch to 3.0 inches, and more preferably has a width 159 of 1.0 inch+/−0.03 inch.

As shown in FIGS. 2A-2B, the snap-on attachment base 78 further comprises the side arms 90, or side walls, such as the first side arm 90a, or first side wall, and the second side arm 90b, or second side wall, positioned symmetrically and opposite to each other and designed to snap fit against opposing sides 52 (see FIG. 9A) of the elongate bar structure 42 (see FIG. 9A). As further shown in FIGS. 2A-2B, each side arm 90 has the bottom end 94 and a top end 95, and the snap-fit edge portion 92 formed at the bottom end 94 of each side arm 90. As further shown in FIG. 2C, each side arm 90 has an inner side 160 and an outer side 162. The side arms 90 depend downwardly from edges 164 (see FIG. 2C) of the top platform end 156 (see FIGS. 2A, 2C), to form a right angle 165 (see FIG. 2C), or a 90 degree angle, with respect to the top platform end 156. The snap-on attachment base 78 is designed for the snap-on attachment 80 (see FIG. 1), such as the one-step snap-on attachment 80a (see FIG. 1). The first side arm 90a and the second side arm 90b secure the one-piece co-molded snap-on apparatus 10 to the portion 42a (see FIG. 9A) of the elongate bar structure 42 (see FIG. 9A), such as the spanner bar 44 (see FIG. 9A), between the first side arm 90a and the second side arm 90b.

Figure 9B:
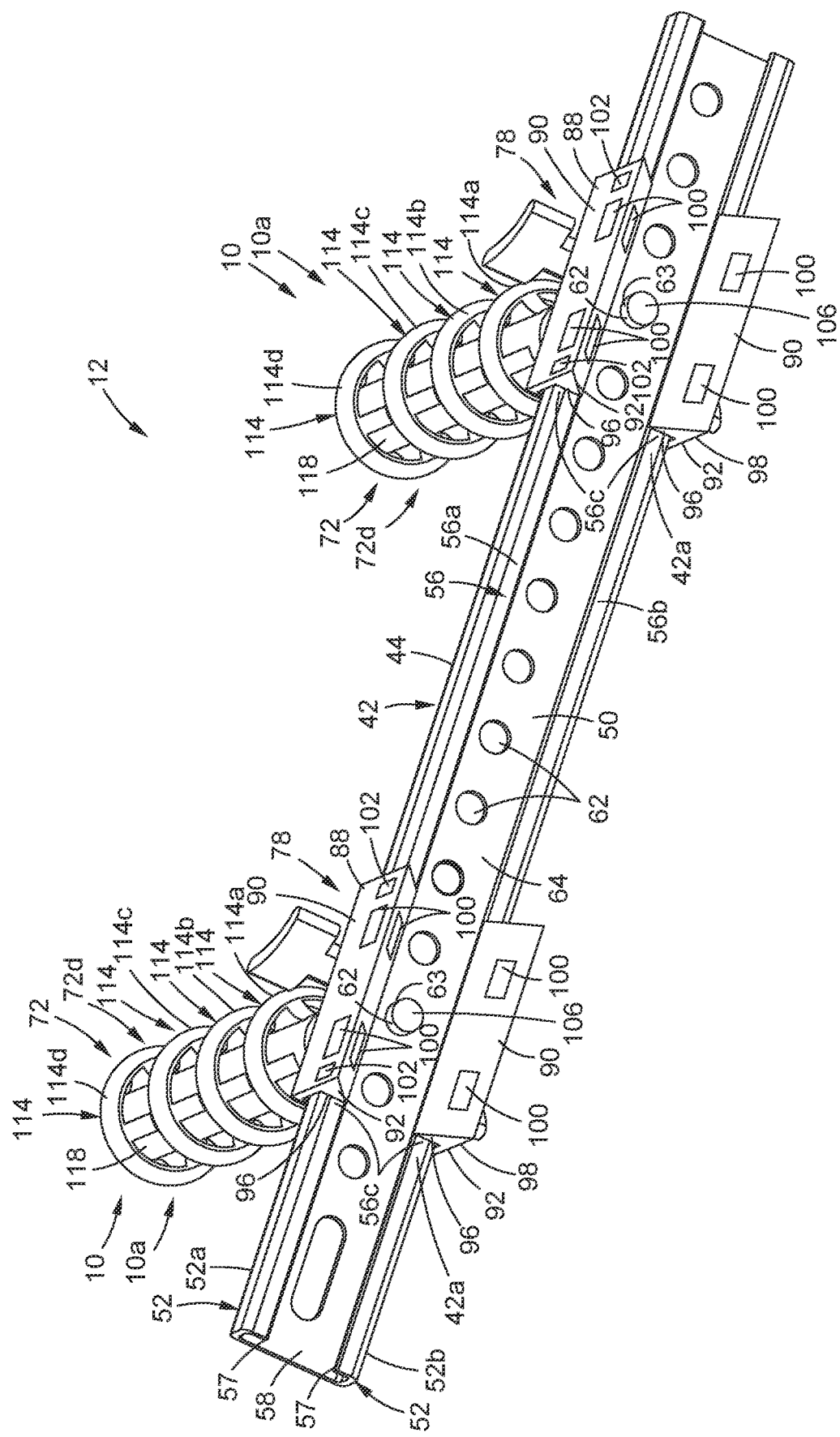
FIG. 9B is an illustration of a bottom right side perspective view of the support system with the one-piece co-molded snap-on apparatuses installed on the elongate bar structure of FIG. 9A.

Each snap-fit edge portion 92 (see FIGS. 2A-2B) has the topmost surface 96 designed to fit against the bottommost surface 56c (see FIG. 9B) of the elongate bar structure 42 (see FIG. 9B). As shown in FIGS. 2A, 2C, the topmost surface 96 is a substantially flat and straight surface. As shown in FIGS. 2A, 2C, each snap-fit edge portion 92 further has a triangular shape 98 formed by the topmost surface 96, a sloped side 166, such as a downwardly sloped side, and an outer side portion 162a of the outer side 162 of the side arms 90 of the bottom attachment portion 88. As shown in FIGS. 2A, 2D, the outer side 162 of each side arm 90 has two through openings 100, such as a first through opening 100a (see FIG. 2A) and a second through opening 100b (see FIG. 2A), formed through each side arm 90. Each through opening 100 is formed through the outer side 162 and through the inner side 160 of the side arms 90 and is formed through the sloped side 166 of the snap-fit edge portion 92. As shown in FIG. 2D, in one version, each through opening 100 has a rectangular shape 168. However, in other versions, the through opening 100 has another suitable geometric shape. FIG. 2A shows in one version two through openings 100. In other versions, the number of through openings may be more than two, such as three, four, or more.

As shown in FIGS. 2A, 2D, each side arm 90 of the bottom attachment portion 88 further comprises two indentations 102, such as a first indentation 102*a* (see FIG. 2A) and a second indentation 102*b* (see FIG. 2A), formed on the exterior 104 of the snap-fit edge portion 92 of each side arm 90 and formed in the outer side 162 of each side arm 90. In this version, as shown in FIG. 2A, the indentations 102 are not formed through the inner side 160 of the side arms 90 and are not formed through the sloped side 166 of the snap-fit edge portion 92. The indentations 102 are not through indentations but are like recessed portions or cut-out portions formed on the exterior 104 of the snap-fit edge portion 92 of each side arm 90. As shown in FIG. 2D, in one version, each indentation 102 has a square shape 170. However, in other versions, the indentation 102 has another suitable geometric shape. As shown in FIG. 2D, the one indentation 102 is positioned near a first end 172*a* of the side arm 90 and one indentation 102 is positioned near a second end 172*b* of the side arm 90 at outer positions 174*a* on the outer side 162 of the side arm 90 along the length of the outer side 162 of the side arm 90. As further shown in FIG. 2D, the two through openings 100 are positioned inward of the two indentations 102 at inner positions 174*b*. The indentations 102 are optional, and as shown in FIG. 2J, in one version, the snap-on attachment base 78 of the one-piece co-molded snap-on apparatus 10 has the bottom attachment portion 88 with two through openings 100 formed through the outer side 162 and through the inner side 160 of the side arms 90, and with no indentations 102 (see FIG. 2D) formed on the exterior 104 of the snap-fit edge portion 92 of each side arm 90 for the no indentation version 103.

As shown in FIGS. 2F-2H, the bottom attachment portion 88 of the snap-on attachment base 78 has at least one centering element 106 projecting from the interior surface 108 of the bottom attachment portion 88 of the snap-on attachment base 78, and the at least one centering element 106 projects inwardly into the channel 110 (see also FIGS. 2A, 2B) formed between the side arms 90. FIG. 2F shows the one-piece co-molded snap-on apparatus 10 having the bottom attachment portion 88 of the snap-on attachment base 78 with one centering element 106 having the one centering element configuration 106*a*. FIG. 2G shows the one-piece co-molded snap-on apparatus 10 having the bottom attachment portion 88 of the snap-on attachment base 78 with two centering elements 106 having the two centering elements configuration 106*b*. FIG. 2H shows the one-piece co-molded snap-on apparatus 10 having the bottom attachment portion 88 of the snap-on attachment base 78 with three centering elements 106 having the three centering elements configuration 106*c*. As shown in FIGS. 2F-2H, each centering element 106 has a circular shaped profile 176. As shown in FIG. 2B, each centering element 106 may be in the form of a cylindrical protrusion 178 or a small peg-like protrusion that is designed and used to mate with a hole 62 (see FIG. 9A) in the elongate bar structure 42 (see FIG. 9A) to center the one-piece co-molded snap-on apparatus 10 on the elongate bar structure 42. The diameter of the centering element 106, such as the cylindrical protrusion 178 is slightly smaller than the diameter of the hole 62 in the elongate bar structure 42, and the centering element 106, such as the cylindrical protrusion 178, is designed to securely and snugly fit within the hole 62.

In one version of the one-piece co-molded snap-on apparatus 10, as shown in FIG. 2I, the ring post 72, such as in the form of the 2-ring ring post 72*b*, with two rings 114, has a ring post body 118 with a center interior 124*a* having an insert 76, such as a metal rod insert 76*a*, extending through the center interior 124*a* and through a center interior 179 of the top support portion 84 of the snap-on attachment base 78. The insert 76, such as the metal rod insert 76*a*, is preferably made of a strong and sturdy metal material, such as titanium, steel, stainless steel, or another suitably strong and sturdy metal material, to lend reinforcement and support to the ring post 72, in particular, if there is a stack-up of several ring posts 72. As shown in FIG. 2I, the insert 76, such as the metal rod insert 76*a*, has a rod body 180 with a first end 182*a* at the opening 128, such as the threaded opening 128*a*. The rod body 180 is connected to, or integral with, a flared base 182 (see FIG. 2I) that flares out from a portion 180*a* (see FIG. 2I) of the rod body 180. A second threaded end (not shown) of the rod body 180 is threaded and configured for insertion through a hole 62 (see FIGS. 1, 9A) in the elongate bar structure 42 (see FIG. 9A), such as the spanner bar 44 (see FIG. 9A). Although the insert 76, such as the metal rod insert 76*a*, is shown in FIG. 2I with the 2-ring ring post 72*b*, the insert 76, such as the metal rod insert 76*a*, may be used with any of the ring posts 72 shown in FIGS. 3-7. FIG. 2I further shows each side arm 90, or side wall, of the bottom attachment portion 88, with the snap-fit edge portion 92 having the triangular shape 98 and the two through openings 100 formed through each side arm 90, and the two indentations 102.

FIG. 2J shows the one-piece co-molded snap-on apparatus 10 with the ring post 72, such as in the form of the 2-ring ring post 72*b*, with two rings 114, such as the first ring 114*a* and the second ring 114*b*, co-molded to, and integral with, the snap-on attachment base 78 having the top support portion 84 integral with the bottom attachment portion 88. FIG. 2J further shows each side arm 90, or side wall, of the bottom attachment portion 88, with the snap-fit edge portion 92 having the triangular shape 98 and the two through openings 100 formed through each side arm 90. FIG. 2J shows the no indentation version 103 with no indentations 102 (see FIG. 2A).

In other versions, one or more additional apparatuses may be attached to the second end 116*b* (see FIGS. 2A, 5B), or top end, of the ring post 72 of the one-piece co-molded snap-on apparatus 10, at the opening 128 (see FIGS. 2A, 5B), such as the threaded opening 128*a* (see FIGS. 2A, 5B). Such additional apparatuses may include one or more threaded end ring posts to create a ring post stack-up of multiple ring posts 72, a p-clamp, such as a latch p-clamp, a threaded end p-clamp assembly, a p-clamp fastener assembly, a connector attachment plate, or another suitable additional apparatus.

Figure 3:
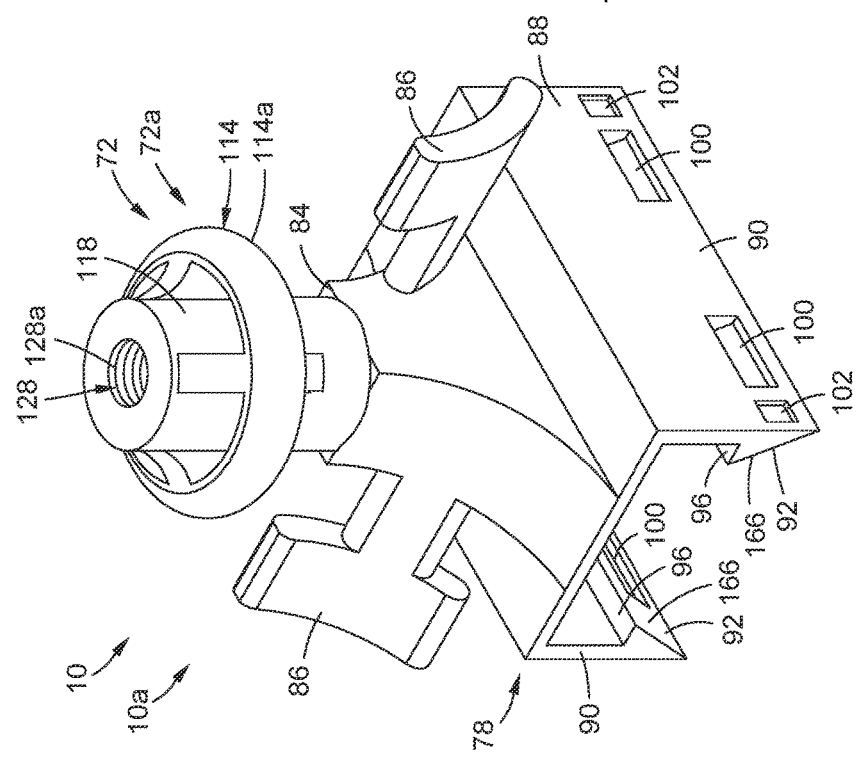
FIG. 3 is an illustration of a front right side perspective view of an exemplary version of a one-piece co-molded snap-on apparatus of the disclosure, showing a ring post with one ring and a bottom attachment portion with two through openings and two indentations.

Now referring to FIG. 3, FIG. 3 is an illustration of a front right side perspective view of an exemplary version of a one-piece co-molded snap-on apparatus 10, such as the one-piece co-molded snap-on apparatus 10*a*, of the disclosure, having the ring post 72 comprising a 1-ring ring post 72*a* with one ring 114, such as a first ring 114*a*, on the ring post body 118. As shown in FIG. 3, the ring post 72 is co-molded to, and integral with, the top support portion 84 of the snap-on attachment base 78. The ring post 72 has the opening 128 (see FIG. 3), such as the threaded opening 128*a* (see FIG. 3). FIG. 3 shows the top support portion 84 with the curved support surface elements 86, and shows the bottom attachment portion 88 integral with the top support portion 84, where the bottom attachment portion 88 has side arms 90, or side walls, each having the snap-fit edge portion 92 having the topmost surface 96, the sloped side 166, and the triangular shape 98. As further shown in FIG. 3, the side arms 90 of the bottom attachment portion 88 each have two through openings 100 and two indentations 102. The one-piece co-molded snap-on apparatus 10 for FIG. 3 further includes at least one centering element 106 (see FIG. 2B). The other portions of the ring post 72 and the bottom attachment portion 88 of FIG. 3 are similar to as described with respect to FIGS. 2A-2H.

Figure 4:
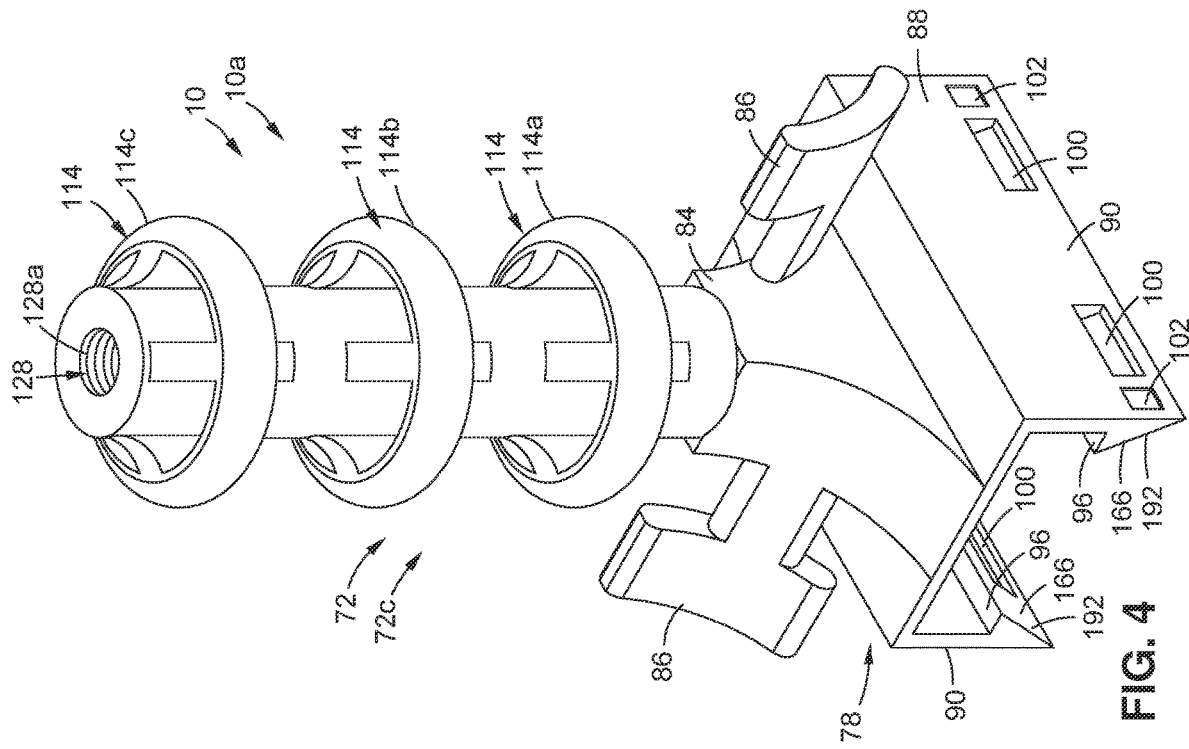
FIG. 4 is an illustration of a front right side perspective view of an exemplary version of a one-piece co-molded snap-on apparatus of the disclosure, showing a ring post with three rings and a bottom attachment portion with two through openings and two indentations.

Now referring to FIG. 4, FIG. 4 is an illustration of a front right side perspective view of an exemplary version of a one-piece co-molded snap-on apparatus 10, such as the one-piece co-molded snap-on apparatus 10a, of the disclosure, having the ring post 72 comprising a 3-ring ring post 72c with three rings 114, such as a first ring 114a, a second ring 114b, and a third ring 114c, on the ring post body 118. As shown in FIG. 4, the ring post 72 is co-molded to, and integral with, the top support portion 84 of the snap-on attachment base 78. The ring post 72 has the opening 128 (see FIG. 4), such as the threaded opening 128a (see FIG. 4). FIG. 4 shows the top support portion 84 with the curved support surface elements 86, and shows the bottom attachment portion 88 integral with the top support portion 84, where the bottom attachment portion 88 has side arms 90 each having the snap-fit edge portion 92 having the topmost surface 96, the sloped side 166, and the triangular shape 98. As further shown in FIG. 4, the side arms 90 of the bottom attachment portion 88 each have two through openings 100 and two indentations 102. The one-piece co-molded snap-on apparatus 10 for FIG. 4 further includes at least one centering element 106 (see FIG. 2B). The other portions of the ring post 72 and the bottom attachment portion 88 of FIG. 4 are similar to as described with respect to FIGS. 2A-2H.

Figure 5F:
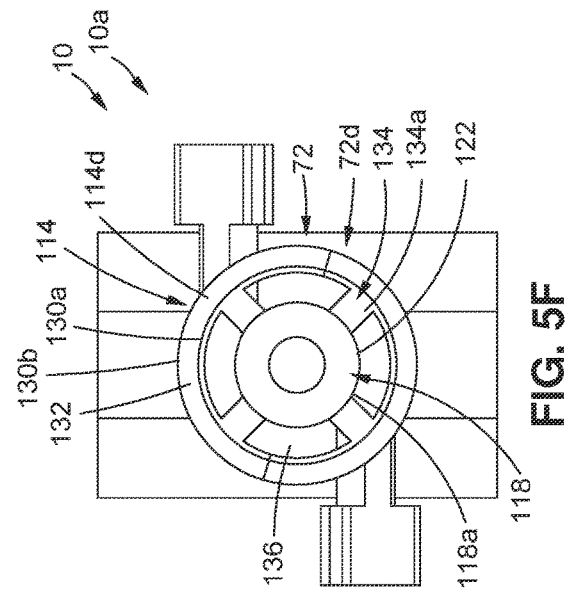
FIG. 5F is an illustration of a top view of the one-piece co-molded snap-on apparatus of FIG. 5A.

Now referring to FIGS. 5A-5I, FIGS. 5A-5I show versions of the one-piece co-molded snap-on apparatus 10, such as the one-piece co-molded snap-on apparatus 10a, of the disclosure, having the ring post 72, such as in the form of a 4-ring ring post 72d, with four rings 114, such as the first ring 114a, the second ring 114b, the third ring 114c, and a fourth ring 114d. FIG. 5A is an illustration of a front perspective view of an exemplary version of the one-piece co-molded snap-on apparatus 10 of the disclosure, showing the ring post 72, such as in the form of the 4-ring ring post 72d, with the four rings 114 on the ring post body 118. As shown in FIG. 5A, the ring post 72 is co-molded to, and integral with, the top support portion 84 of the snap-on attachment base 78. The ring post 72 has the opening 128 (see FIG. 5B), such as the threaded opening 128a (see FIG. 5B). FIG. 5A shows the top support portion 84 with the curved support surface elements 86, and shows the bottom attachment portion 88 integral with the top support portion 84, where the bottom attachment portion 88 has side arms 90, such as the first side arm 90a and the second side arm 90b, each having the snap-fit edge portion 92 having the topmost surface 96, the sloped side 166, and the triangular shape 98. As further shown in FIG. 5A, the side arms 90 of the bottom attachment portion 88 each have two through openings 100 and two indentations 102.

Figure 5G:
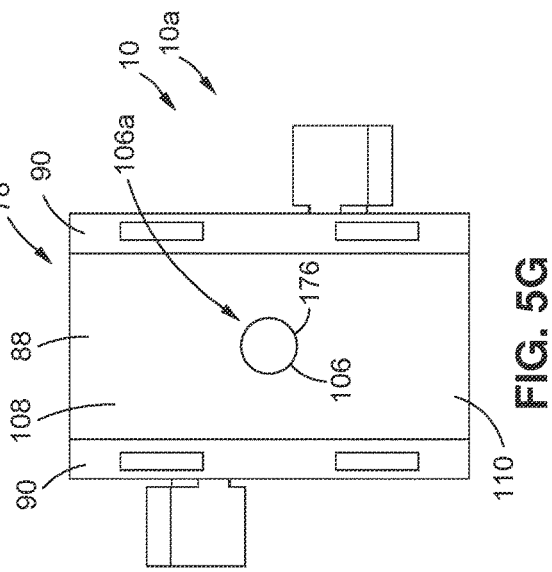
FIG. 5G is an illustration of a bottom view of the one-piece co-molded snap-on apparatus of FIG. 5A, having one centering element.
Figure 5E:
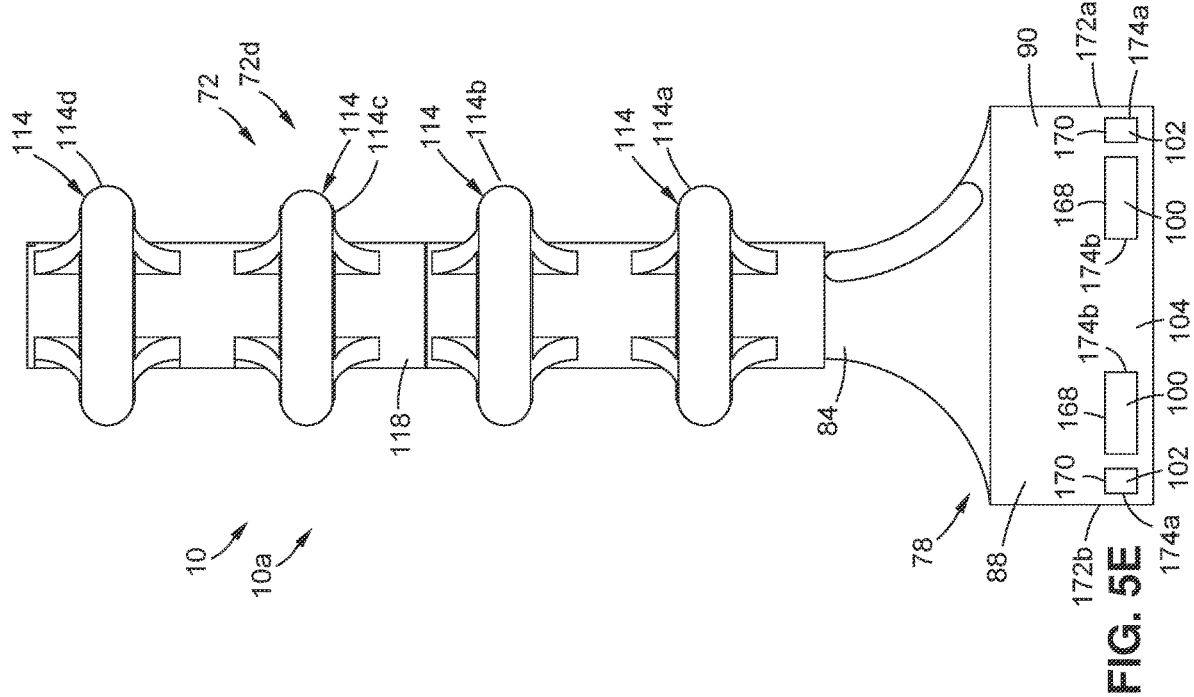
FIG. 5E is an illustration of a left side view of the one-piece co-molded snap-on apparatus of FIG. 5A.

FIG. 5B is an illustration of a front right side perspective view of the one-piece co-molded snap-on apparatus 10 of FIG. 5A, showing the ring post 72, such as in the form of the 4-ring ring post 72d, with the four rings 114 on the ring post body 118. FIG. 5C is an illustration of a front view of the one-piece co-molded snap-on apparatus 10 of FIG. 5A, showing the ring post 72, such as in the form of the 4-ring ring post 72d, with the four rings 114 on the ring post body 118. FIG. 5D is an illustration of a back view of the one-piece co-molded snap-on apparatus 10 of FIG. 5A, showing the ring post 72, such as in the form of the 4-ring ring post 72d, with the four rings 114 on the ring post body 118. FIG. 5E is an illustration of a left side view of the one-piece co-molded snap-on apparatus 10 of FIG. 5A, showing the ring post 72, such as in the form of the 4-ring ring post 72d, with the four rings 114 on the ring post body 118. FIG. 5F is an illustration of a top view of the one-piece co-molded snap-on apparatus 10 of FIG. 5A. FIG. 5G is an illustration of a bottom view of the one-piece co-molded snap-on apparatus 10 of FIG. 5A, having one centering element 106. FIG. 5H is an illustration of a bottom view of the one-piece co-molded snap-on apparatus 10 of FIG. 5A, having two centering elements 106. FIG. 5I is an illustration of a bottom view of the one-piece co-molded snap-on apparatus 10 of FIG. 5A, having three centering elements 106.

FIGS. 5A-5E show the one-piece co-molded snap-on apparatus 10 comprising the ring post 72, such as in the form of the 4-ring ring post 72d, with four rings 114, co-molded to the snap-on attachment base 78. As further shown in FIGS. 5A-5E, the snap-on attachment base 78 comprises the top support portion 84 integral with and co-molded with the ring post 72, and the top support portion 84 has curved support surface elements 86 on opposite sides 87 of the top support portion 84. As shown in FIGS. 5A-5E, the snap-on attachment base 78 further comprises the bottom attachment portion 88 integral with the top support portion 84.

As shown in FIG. 5A, the ring post 72 has the first end 116a, such as the bottom end, the second end 116b, such as the top end, and the ring post body 118, such as a the shaft 118a, formed between the first end 116a and the second end 116b, and the ring post body 118 having the generally cylindrical shape 120 with the exterior 122 and the interior 124 (see FIG. 5B). As further shown in FIG. 5A, the rings 114 of the ring post 72 are tiered in a tiered alignment 126 with each other, and spaced apart from each other, along the length of the ring post body 118, such as the shaft 118a. As shown in FIG. 5B, the second end 116b, such as the top end, has the opening 128, such as the threaded opening 128a. One or more additional ring posts 72 may be added to the ring post 72 co-molded with the snap-on attachment base 78 by inserting a threaded post of an added ring post into the opening 128, such as the threaded opening 128a, in the second end 116b, such as the top end, of the ring post 72, to form a stack-up of ring posts 72.

As shown in FIG. 5F, the ring 114 has the inner circumference 130a, the outer circumference 130b, and the ring body 132. As shown in FIGS. 5A, 5F, each ring 114 is integral with, and spaced from, the ring post body 118, such as the shaft 118a, via spokes 134, such as radially extending spokes 134a, positioned between portions of the exterior 122 of the ring post body 118, and the ring body 132. Each ring 114 is integral with, and secured to, portions of the exterior 122 of the ring post body 118, via the spokes 134 that radially extend from the ring post body 118. As shown in FIG. 5F, the spokes 134 are spaced with respect to each other at 90 degree angles and define a corresponding number of through openings 136, or slots, between the spokes 134. The ring post 72 comprises one or more rings 114 each having one or more spokes 134, such as radially extending spokes 134a, that define the corresponding number of through openings 136, or slots, therebetween. The spokes 134 separate the through openings 136, or slots. Similar to a clock face, the 4 (four) spokes 134 shown in FIG. 2E are generally at the positions of 12 o'clock, 3 o'clock, 6 o'clock, and 9 o'clock.

The plurality of through openings 136, or slots, are of a sufficient size to receive a fastener device 138 (see FIG. 10), such as the cable tie 138b (see FIG. 10), the zip tie 138a (see FIG. 9A), or another suitable fastener or attachment device. As shown in FIG. 5F, the ring 114 has 4 (four) spokes 134 and 4 (four) through openings 136. However the ring 114 may have another suitable number of spokes and corresponding through openings. When the ring post 72 has two or more rings 114, the spokes 134 and through openings 136 of each ring 114 are aligned with the spokes 134 and through openings 136 of the other rings 114 on the ring post body 118, such as the shaft 118a, and the rings 114 are tiered in the tiered alignment 126 (see FIG. 5A) with each other and, in use, are in alignment with the elongate bar structure 42 (see FIG. 9A), such as the spanner bar 44 (see FIG. 9A).

As shown in FIG. 5B, the snap-on attachment base 78 comprises the top support portion 84 having the first end 140a, or bottom end, the second end 140b, or top end, and the body 142 formed between the first end 140a and the second end 140b. As shown in FIG. 5B, the second end 140b of the top support portion 84 is co-molded with, and integral with, the first end 116a, or bottom end, of the ring post 72. The body 142 of the top support portion 84 comprises opposite sides 87, such as straight sides 87a (see FIG. 5B), and curved sides 144 (see FIG. 5B) in between the straight sides 87a.

As shown in FIG. 5B, the top support portion 84 has two (2) curved support surface elements 86 extending on the opposite sides 87, such as the straight sides 87a, of the top support portion 84. As further shown in FIG. 5B, the curved support surface elements 86 comprise the first curved support surface element 86a and the second curved support surface element 86b, integrally formed with the top support portion 84, and extending away from, or outwardly from, the opposite sides 87 comprising the straight sides 87a of the top support portion 84. The curved support surface elements 86 are designed to support the elongate elements 26 (see FIGS. 1, 9A), and/or to support the harnesses 28 (see FIG. 1) bundling, holding, and/or surrounding, the elongate elements 26.

As further shown in FIG. 5B, the curved support surface elements 86 comprise the first curved support surface element 86a and the second curved support surface element 86b, each comprising the curved support 146 having the curved support surface side 148a, or contact side, and the back side 148b, or non-contact side. The curved support surface side 148a of the curved support 146 has the curved shape similar to the curved sides 144 (see FIG. 5B) of the top support portion 84, so that an elongate element 26 (see FIG. 9A), such as a wire 34 (see FIG. 9A) or cable 36 (see FIG. 10), such as an electrical cable (see FIG. 10), is supported on the curved support surface side 148a of the curved support 146 and one of the curved sides 144 of the top support portion 84, when coupled to the one-piece co-molded snap-on apparatus 10.

Each of the curved support surface elements 86, such as the first curved support surface element 86a and the second curved support surface element 86b, further comprises the extender arm 150 (see FIG. 5C), each having the first end 152a (see FIG. 5C) integral with the body 142 of the top support portion 84, and extending outwardly from the straight sides 87a of the top support portion 84, and each having the second end 152b (see FIG. 5C) integral with the curved support 146. Each extender arm 150 defines recess portions 154 (see FIG. 5C) formed above and below the extender arm 150, and formed between the curved support 146 and the straight side 87a of the top support portion 84.

As shown in FIGS. 5B, 5C, the snap-on attachment base 78 further comprises the bottom attachment portion 88 integral with, and co-molded with, the top support portion 84, and the bottom attachment portion 88 of the snap-on attachment base 78 has the interior surface 108 and the exterior surface 109, and has the top platform end 156 having the substantially flat surface 157. As further shown in FIGS. 5A, 5C, the snap-on attachment base 78 further comprises the side arms 90, such as the first side arm 90a and the second side arm 90b, positioned symmetrically and opposite to each other and designed to snap fit against opposing sides 52 (see FIG. 9A) of the elongate bar structure 42 (see FIG. 9A). As further shown in FIGS. 5A, 5C, each side arm 90 has the bottom end 94 and the top end 95, and the snap-fit edge portion 92 formed at the bottom end 94 of each side arm 90. As further shown in FIG. 5C, each side arm 90 has the inner side 160 and the outer side 162. As shown in FIG. 5D, the side arms 90 depend downwardly from edges 164 of the top platform end 156, to form the right angle 165, or a 90 degree angle, with respect to the top platform end 156. The snap-on attachment base 78 is designed for the snap-on attachment 80 (see FIG. 1), such as the one-step snap-on attachment 80a (see FIG. 1). The first side arm 90a and the second side arm 90b secure the one-piece co-molded snap-on apparatus 10 to the portion 42a of the elongate bar structure 42, such as the spanner bar 44, between the first side arm 90a and the second side arm 90b.

Each snap-fit edge portion 92 (see FIGS. 5A, 5D) has the topmost surface 96 (see FIGS. 5A, 5D) designed to fit against the bottommost surface 56c (see FIG. 9B) of the elongate bar structure 42 (see FIG. 9B). As shown in FIGS. 5A, 5D, the topmost surface 96 is a substantially flat and straight surface, and each snap-fit edge portion 92 further has the triangular shape 98 formed by the topmost surface 96, the sloped side 166, such as a downwardly sloped side, and the outer side portion 162a of the outer side 162 of the side arms 90 of the bottom attachment portion 88. As shown in FIGS. 5A, 5B, 5E, the outer side 162 of each side arm 90 has two through openings 100 formed through each side arm 90, and each through opening 100 is formed through the outer side 162 and through the inner side 160 of the side arms 90 and is formed through the sloped side 166 of the snap-fit edge portion 92. As shown in FIG. 5E, in one version, each through opening 100 has the rectangular shape 168. However, in other versions, the through opening 100 has another suitable geometric shape.

As shown in FIGS. 5A, 5B, 5E, each side arm 90 of the bottom attachment portion 88 further comprises two indentations 102 formed on the exterior 104 of the snap-fit edge portion 92 of each side arm 90 and formed in the outer side 162 of each side arm 90. In this version, the indentations 102 are not formed through the inner side 160 of the side arms 90 and are not formed through the sloped side 166 of the snap-fit edge portion 92, and the indentations 102 are not through indentations but are like recessed portions or cut-out portions formed on the exterior 104 of the snap-fit edge portion 92 of each side arm 90. As shown in FIG. 5E, in one version, each indentation 102 has the square shape 170. However, in other versions, the indentation 102 has another suitable geometric shape. As shown in FIG. 5E, the two indentations 102 are positioned near the first end 172a and the second end 172b at outer positions 174a on the outer side 162 of each side arm 90 along the length of the outer side 162, and the two through openings 100 are positioned inward of the two indentations 102 at inner positions 174b. The indentations 102 are optional, and the one-piece co-molded snap-on apparatus 10 having the ring post 72, such as in the form of the 4-ring ring post 72d, with four rings 114, of FIGS. 5A-5I may have the bottom attachment portion 88 of the snap-on attachment base 78 with two through openings 100 formed through the outer side 162 and through the inner side 160 of the side arms 90, and with no indentations 102 (see FIG. 5A) formed on the exterior 104 of the snap-fit edge portion 92 of each side arm 90, similar to the no indentation version 103 of FIG. 2J.

As shown in FIGS. 5A, 5C, 5G-5I, the bottom attachment portion 88 of the snap-on attachment base 78 has at least one centering element 106 projecting from the interior surface 108 of the bottom attachment portion 88 of the snap-on attachment base 78, and the at least one centering element 106 projects inwardly into the channel 110 formed between the side arms 90. FIGS. 5A, 5C, 5G shows the one-piece co-molded snap-on apparatus 10 having the bottom attachment portion 88 of the snap-on attachment base 78 with one centering element 106 having the one centering element configuration 106a. FIG. 5H shows the one-piece co-molded snap-on apparatus 10 having the bottom attachment portion 88 of the snap-on attachment base 78 with two centering elements 106 having the two centering elements configuration 106b. FIG. 5I shows the one-piece co-molded snap-on apparatus 10 having the bottom attachment portion 88 of the snap-on attachment base 78 with three centering elements 106 having the three centering elements configuration 106c. As shown in FIGS. 5G-5I, each centering element 106 has the circular shaped profile 176. As shown in FIGS. 5A, 5C, each centering element 106 may be in the form of the cylindrical protrusion 178 or a small peg-like protrusion that is designed and used to mate with a hole 62 (see FIG. 9A) in the elongate bar structure 42 (see FIG. 9A) to center the one-piece co-molded snap-on apparatus 10 on the elongate bar structure 42. The diameter of the centering element 106, such as the cylindrical protrusion 178 is slightly smaller than the diameter of the hole 62 in the elongate bar structure 42, and the centering element 106, such as the cylindrical protrusion 178, is designed to securely and snugly fit within the hole 62.

Figure 6:
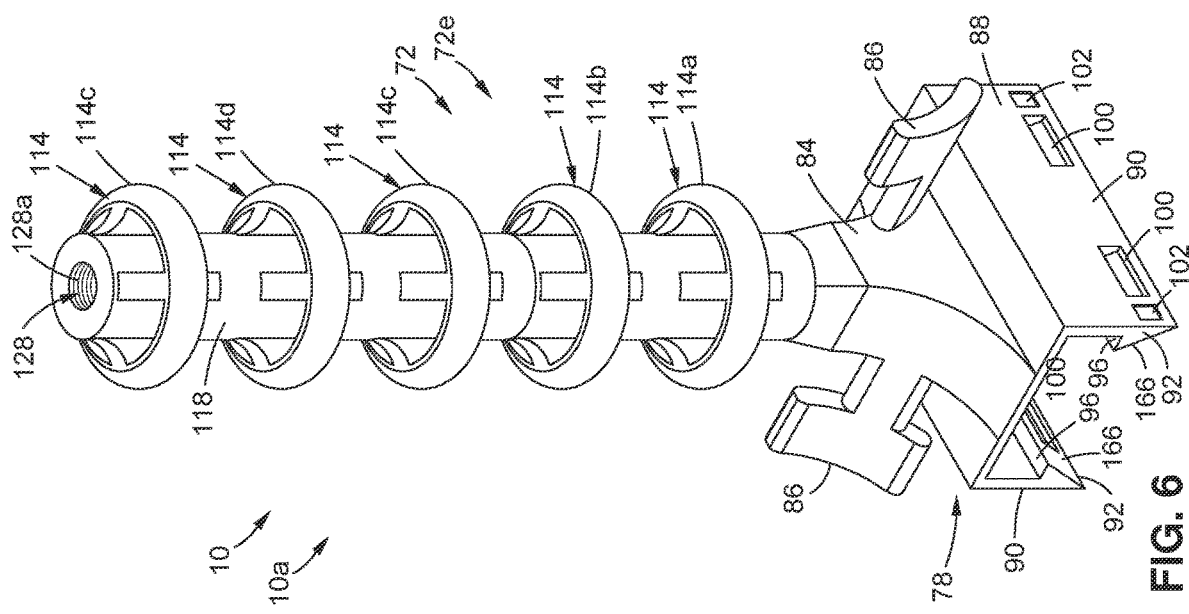
FIG. 6 is an illustration of a front right side perspective view of an exemplary version of a one-piece co-molded snap-on apparatus of the disclosure, showing a ring post with five rings and a bottom attachment portion with two through openings and two indentations.

Now referring to FIG. 6, FIG. 6 is an illustration of a front right side perspective view of an exemplary version of a one-piece co-molded snap-on apparatus 10, such as the one-piece co-molded snap-on apparatus 10a, of the disclosure, having the ring post 72 comprising a 5-ring ring post 72e with five rings 114, such as the first ring 114a, the second ring 114b, the third ring 114c, the fourth ring 114d, and the fifth ring 114e, on the ring post body 118. As shown in FIG. 6, the ring post 72 is co-molded to, and integral with, the top support portion 84 of the snap-on attachment base 78. The ring post 72 has the opening 128 (see FIG. 6), such as the threaded opening 128a (see FIG. 6). FIG. 6 shows the top support portion 84 with the curved support surface elements 86, and shows the bottom attachment portion 88 integral with the top support portion 84, where the bottom attachment portion 88 has side arms 90 each having the snap-fit edge portion 92 having the topmost surface 96, the sloped side 166, and the triangular shape 98. As further shown in FIG. 6, the side arms 90 of the bottom attachment portion 88 each have two through openings 100 and two indentations 102. The one-piece co-molded snap-on apparatus 10 for FIG. 6 further includes at least one centering element 106 (see FIG. 2B). The other portions of the ring post 72 and the bottom attachment portion 88 of FIG. 6 are similar to as described with respect to FIGS. 2A-2H.

Figure 7:
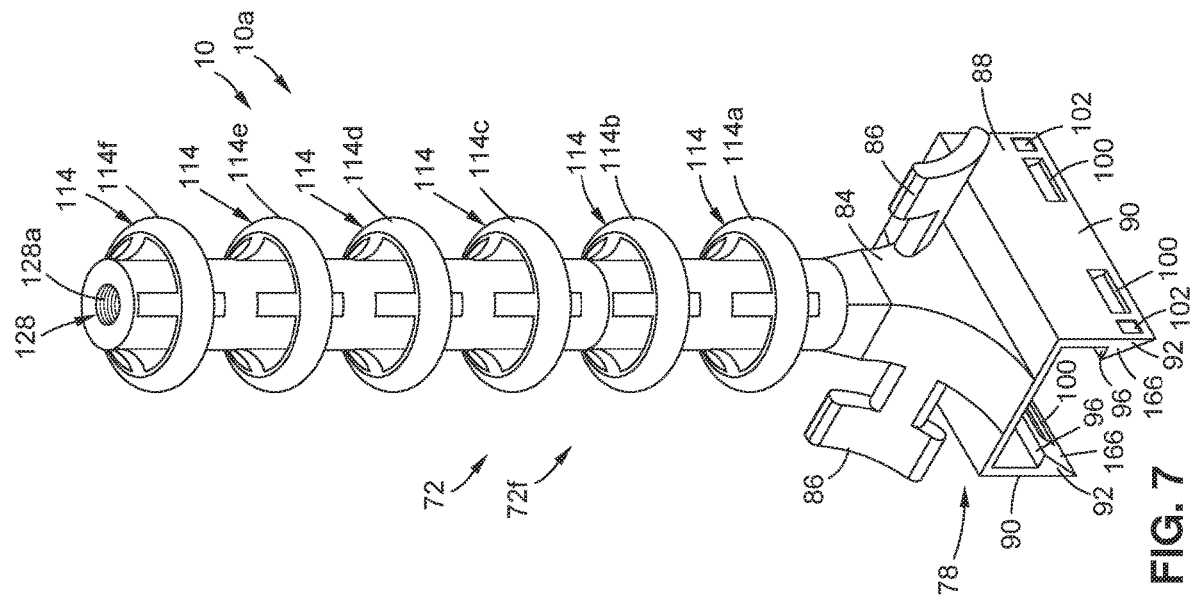
FIG. 7 is an illustration of a front right side perspective view of an exemplary version of a one-piece co-molded snap-on apparatus of the disclosure, showing a ring post with six rings and a bottom attachment portion with two through openings and two indentations.

Now referring to FIG. 7, FIG. 7 is an illustration of a front right side perspective view of an exemplary version of a one-piece co-molded snap-on apparatus 10, such as the one-piece co-molded snap-on apparatus 10a, of the disclosure, having the ring post 72 comprising a 6-ring ring post 72f with six rings 114, such as the first ring 114a, the second ring 114b, the third ring 114c, the fourth ring 114d, the fifth ring 114e, and the sixth ring 114f, on the ring post body 118. As shown in FIG. 7, the ring post 72 is co-molded to, and integral with, the top support portion 84 of the snap-on attachment base 78. The ring post 72 has the opening 128 (see FIG. 7), such as the threaded opening 128a (see FIG. 7). FIG. 7 shows the top support portion 84 with the curved support surface elements 86, and shows the bottom attachment portion 88 integral with the top support portion 84, where the bottom attachment portion 88 has side arms 90 each having the snap-fit edge portion 92 having the topmost surface 96, the sloped side 166, and the triangular shape 98. As further shown in FIG. 6, the side arms 90 of the bottom attachment portion 88 each have two through openings 100 and two indentations 102. The one-piece co-molded snap-on apparatus 10 for FIG. 7 further includes at least one centering element 106 (see FIG. 2B). The other portions of the ring post 72 and the bottom attachment portion 88 of FIG. 7 are similar to as described with respect to FIGS. 2A-2H.

Now referring to FIGS. 8A-8B, FIG. 8A is an illustration of a right side perspective view of another exemplary version of a one-piece co-molded snap-on apparatus 10, such as a one-piece co-molded snap-on apparatus 10b, of the disclosure, having a monument 74 co-molded with, and integral with, the snap-on attachment base 78 having the top support portion 84 integral with the bottom attachment portion 88, the bottom attachment portion 88 having two through openings 100 and two indentations 102. FIG. 8B is an illustration of a right side perspective view of the one-piece co-molded snap-on apparatus 10, such as a one-piece co-molded snap-on apparatus 10b, with the monument 74 of FIG. 8A, showing the bottom attachment portion 88 with two through openings 100 and no indentations 102 (see FIG. 8A) in the no indentation version 103.

FIGS. 8A-8B show the monument 74 having a first end 184a, such as a bottom end, a second end 184b, such as a top end, and a body 185, such as a tower body or post body, having three (3) openings 186, such as square openings 186a, formed through first sides 188a of the body 185 of the monument 74. The first sides 188a are opposite each other. As shown in FIGS. 8A-8B, the openings 186, such as the square openings 186a, define registration positions 190 along a height 192 of the monument 74. As shown in FIGS. 8A-8B, the monument 74 further has second sides 188b opposite each other. Each first side 188a preferably has a width 194a (see FIGS. 8A-8B) in a range of 0.2 inch to 0.8 inch, and more preferably has a width 189a of 0.4 inch+/– (plus or minus) 0.03 inch. Each second side 188b preferably has a width 194b (see FIGS. 8A-8B) in a range of 0.2 inch to 0.8 inch, and more preferably has a width 189b of 0.4 inch+/–0.03 inch. In one version, the monument 74 preferably has a height 192 (see FIGS. 8A-8B) in a range of 0.75 inch to 3.0 inches, and more preferably has a height 192 of 1.04 inches+/–0.02 inch.

As shown in FIGS. 8A-8B, the monument 74, such as the first end 184a, or bottom end, of the monument 74, is co-molded to, and integral with, the second end 140b, or top end, of the top support portion 84 of the one-piece co-molded snap-on apparatus 10. As shown in FIGS. 8A-8B, the top support portion 84 has curved support surface elements 86 on opposite sides 87 of the top support portion 84. In one version, the top support portion 84 preferably has a height in a range of 0.5 inch to 1.25 inches, and more preferably has a height of 0.75 inch+/−0.02 inch.

As shown in FIGS. 8A-8B, the snap-on attachment base 78 further comprises the bottom attachment portion 88 integral with the top support portion 84. The bottom attachment portion 88 preferably has a length 158a (see FIG. 8A) in a range of 1.0 inch to 5.0 inches, and more preferably has a length 158a of 1.5 inches+/−0.03 inch, and the bottom attachment portion 88 preferably has a width 159a (see FIG. 8A) in a range of 0.5 inch to 3.0 inches, and more preferably has a width 159a of 1.0 inch+/−0.03 inch.

As shown in FIGS. 8A-8B, the snap-on attachment base 78 further comprises the side arms 90, such as the first side arm 90a and the second side arm 90b, positioned symmetrically and opposite to each other and designed to snap fit against opposing sides 52 (see FIG. 9A) of the elongate bar structure 42 (see FIG. 9A). As further shown in FIGS. 8A-8B, each side arm 90 has the snap-fit edge portion 92. The side arms 90 depend downwardly from edges 164 (see FIG. 8A) of the top platform end 156 to form the right angle 165 (see FIG. 8A), or a 90 degree angle, with respect to the top platform end 156. The snap-on attachment base 78 is designed for the snap-on attachment 80 (see FIG. 1), such as the one-step snap-on attachment 80a (see FIG. 1). The first side arm 90a and the second side arm 90b secure the one-piece co-molded snap-on apparatus 10 to the portion 42a of the elongate bar structure 42 (see FIG. 9A), such as the spanner bar 44, between the first side arm 90a and the second side arm 90b.

Each snap-fit edge portion 92 (see FIGS. 8A-8B) has the topmost surface 96 designed to fit against the bottommost surface 56c (see FIG. 9B) of the elongate bar structure 42 (see FIG. 9B). As shown in FIGS. 8A-8B, the topmost surface 96 is a substantially flat and straight surface. As shown in FIGS. 8A-8B, each snap-fit edge portion 92 further has the triangular shape 98 formed by the topmost surface 96, the sloped side 166, such as a downwardly sloped side, and the outer side portion 162a of the outer side 162 of the side arms 90 of the bottom attachment portion 88. As shown in FIGS. 8A-8B, the outer side 162 of each side arm 90 has two through openings 100 formed through each side arm 90. Each through opening 100 is formed through the outer side 162 and through the inner side 160 of the side arms 90 and is formed through the sloped side 166 of the snap-fit edge portion 92. As shown in FIGS. 8A-8B, in one version, each through opening 100 has the rectangular shape 168. However, in other versions, the through opening 100 has another suitable geometric shape.

As shown in FIG. 8A, each side arm 90 of the bottom attachment portion 88 further comprises two indentations 102 formed on the exterior 104 of the snap-fit edge portion 92 of each side arm 90 and formed in the outer side 162 of each side arm 90. In one version, the indentations 102 are not formed through the inner side 160 of the side arms 90 and are not formed through the sloped side 166 of the snap-fit edge portion 92. The indentations 102 are not through indentations but are like recessed portions or cut-out portions formed on the exterior 104 of the snap-fit edge portion 92 of each side arm 90. As shown in FIG. 8A, in one version, each indentation 102 has a square shape 170. However, in other versions, the indentation 102 has another suitable geometric shape. The indentations 102 are optional, and as shown in FIG. 8B, in the no indentation version 103, the snap-on attachment base 78 of the one-piece co-molded snap-on apparatus 10 has the bottom attachment portion 88 with two through openings 100 formed through the outer side 162 and through the inner side 160 of the side arms 90, and with no indentations 102 (see FIG. 8A) formed on the exterior 104 of the snap-fit edge portion 92 of each side arm 90.

The bottom attachment portion 88 of the snap-on attachment base 78 of the one-piece co-molded snap-on apparatuses 10b of FIGS. 8A-8B also has at least one centering element 106 (see FIGS. 2B, 5B) projecting from the interior surface 108 (see FIGS. 2B, 5B) of the bottom attachment portion 88 of the snap-on attachment base 78, and the at least one centering element 106 projects inwardly into the channel 110 (see FIGS. 8A-8B) formed between the side arms 90.

Now referring to FIGS. 9A-9B, FIG. 9A is an illustration of a right side perspective view of an exemplary version of a support system 12 of the disclosure with one-piece co-molded snap-on apparatuses 10, such as one-piece co-molded snap-on apparatuses 10a, of FIG. 5B, with the ring post 72, such as in the form of the 4-ring ring post 72d, with the four rings 114 on the ring post body 118, installed on an elongate bar structure 42 and routing an elongate element 26, such as a wire 34. FIG. 9B is an illustration of a bottom right side perspective view of the one-piece co-molded snap-on apparatuses 10 installed on the elongate bar structure 42 of FIG. 9A, without showing the elongate element 26, such as the wire 34, of FIG. 9A.

As shown in FIGS. 9A-9B, each one-piece co-molded snap-on apparatus 10 comprises the ring post 72, such as in the form of the 4-ring ring post 72d, with the four rings 114, such as the first ring 114a, the second ring 114b, the third ring 114c, and the fourth ring 114d, on the ring post body 118, co-molded to, and integral with the snap-on attachment base 78 and installed on the elongate bar structure 42, via the snap-on attachment 80 (see FIG. 1), such as the one-step snap-on attachment 80a (see FIG. 1). In particular, as shown in FIG. 9A, the first end 116a, such as the bottom end, of each ring post 72 is co-molded to the second end 140b, such as the top end, of the top support portion 84, and the second end 116b, such as the top end, of the ring post 72 has the opening 128 that may receive another ring post 72 or another suitable attachment device. As shown in FIG. 9A, the top support portion 84 has the curved support surface elements 86 on opposite sides 87 of the top support portion 84.

As shown in FIG. 9A, an elongate element 26, such as an elongate conductive element 26a, for example, a wire 34, is attached with a fastener device 138, such as a zip tie 138a, to the extender arm 150 of one of the curved support surface elements 86. Additional elongate elements 26, such as wires 34, or another elongate element 26, may be attached to the curved support surface elements 86 shown in FIG. 9A.

As further shown in FIGS. 9A-9B, the snap-on attachment base 78 comprises the bottom attachment portion 88 with side arms 90 opposite each other and designed to snap fit against opposing sides 52 of the elongate bar structure 42. As shown in FIGS. 9A-9B, each side arm 90 has the snap-fit edge portion 92 with the topmost surface 96 designed to fit against the bottommost surfaces 56c (see FIG. 9B) of the elongate bar structure 42. FIGS. 9A-9B show the triangular shape 98 of each snap-fit edge portion 92, and shows the two through openings 100 and two indentations 102 in each side arm 90.

As further shown in FIG. 9A, the rings 114 of each ring post 72 are tiered in the tiered alignment 126 with each other, and spaced apart from each other, along the length of the ring post body 118, and the spokes 134 and through openings 136 of each ring 114 are aligned with the spokes 134 and through openings 136 of the 3 (three) other rings 114 on the ring post body 118. Further, the 4 (four) rings 114 are tiered in tiered alignment 126 with each other and with holes 62 (see FIG. 9A) of the portions 42a (see FIG. 9A) of the elongate bar structure 42 (see FIG. 9A), such as the spanner bar 44 (see FIG. 9a), to which the one-piece co-molded snap-on apparatuses 10 are attached.

As shown in FIG. 9A, each of the ring posts 72 is in a clocked orientation 196, where the rings 114, including the spokes 134 and through openings 136 of each ring 114, of the ring post 72 are vertically aligned in parallel with each other and aligned with the desired holes 62 in the elongate bar structure 42, such as the spanner bar 44. Because the ring posts 72 are co-molded with the snap-on attachment base 78, no clocking is needed for the ring posts 72 when in operation. As used herein, "clocking" means a procedure for orienting and aligning the spokes and through openings of the rings of a ring post with respect to the spokes and through openings of the rings of other ring posts in a stack-up of ring posts on an elongate bar structure, such as a spanner bar or a support bar, and orienting and aligning the rings of the ring posts to be parallel or perpendicular to a reference point, such as the elongate bar structure, such as the spanner bar or the support bar.

As shown in FIG. 9A, the elongate bar structure 42, such as in the form of the spanner bar 44, for example, a linear spanner bar 44a, comprises the first end 48a, the second end 48b, the elongate body 50 formed between the first end 48a and the second end 48b, and sides 52, such as the first side 52a and the second side 52b, that depend downwardly from top edges 54 of the elongate body 50. As shown in FIG. 9A, the elongate bar structure 42, such as in the form of the spanner bar 44, further comprises the top end 55, the bottom ends 56 (see FIG. 9B), such as a first bottom end 56a and a second bottom end 56b, integral with, and perpendicular to, the first side 52a and the second side 52b, respectively. As shown in FIG. 9A, the elongate bar structure 42, such as in the form of the spanner bar 44, further comprises the edge surface 57 depending upwardly from each bottom end 56 and facing into the interior channel 58 (see FIG. 9B) formed between the edge surfaces 57 and formed in the interior space of the elongate bar structure 42, such as the spanner bar 44, surrounded by the top end 55, the sides 52, and the bottom ends 56. The top end 55, sides 52, and bottom ends 56 of the elongate bar structure 42, such as the spanner bar 44, form a bracket 59 (see FIG. 9A) having a generally C-shaped configuration 198 (see FIG. 9A). However, the elongate bar structure 42, such as the spanner bar 44, can have other suitable shapes and sizes, including polygonal, round, elliptical, and the like. The elongate bar structure 42, such as the spanner bar 44, may also form a hollow elongate bar structure or may be primarily solid depending on the application.

The one-piece co-molded snap-on apparatuses 10 are attached to the elongate bar structure 42 with a one-step snap-on attachment 80a (see FIG. 1) over the top end 55, the sides 52, the bottom ends 56, and the edge surfaces 57 of each portion 42a (see FIGS. 9A-9B) of the elongate bar structure 42, such as the spanner bar 44, to which the snap-on attachment base 78 is attached. The elongate bar structure 42, such as the spanner bar 44, has holes 62 (see FIGS. 9A-9B), such as through holes, that define registration points 63 (see FIG. 9B) formed through the central portion 64 (see FIG. 9B) of the elongate body 50, along the length of the elongate bar structure 42, such as the spanner bar 44. As shown in FIGS. 9A-9B, the holes 62 are spaced an equal distance apart from each other along the length. In one version, the elongate bar structure 42, such as the spanner bar 44, is about 18 (eighteen) inches long, although the length of the elongate bar structure 42, such as the spanner bar 44, can vary from a few inches to several feet or more depending upon the application. In addition, the elongate bar structure 42, such as the spanner bar 44, may be linear as shown, but may have other, non-linear configurations if so desired.

As shown in FIG. 9A, the elongate bar structure 42, such as the spanner bar 44, has the slot opening 68 formed through the central portion 64 of the elongate body 50, at, or near, the first end 48a of the elongate bar structure 42, such as the spanner bar 44.

As shown in FIGS. 9A-9B, the one-piece co-molded snap-on apparatuses 10 are attached to the portions 42a of the elongate bar structure 42, such as the spanner bar 44, in a spaced apart configuration 200 (see FIG. 9A), with the one centering element 106 (see FIG. 9B) inserted through hole 62, defining registration points 63. As further shown in FIGS. 9A-9B, the one-piece co-molded snap-on apparatuses 10 are attached to the portion 42a of the elongate bar structure 42, such as the spanner bar 44, with the side arms 90 attached over the sides 52, and the bottom ends 56 of each portion 42a of the elongate bar structure 42, such as the spanner bar 44, and the topmost surface 96 of the snap-fit edge portions 92 are engaged and fitted against the bottommost surfaces 56c of the elongate bar structure 42, such as the spanner bar 44. Once the one-piece co-molded snap-on apparatuses 10 are installed on and secured to the elongate bar structure 42, such as the spanner bar 44, one or more elongate elements 26, or harnesses 28 bundling the elongate elements 26, may be attached and routed to the one-piece co-molded snap-on apparatuses 10.

Now referring to FIG. 10, FIG. 10 is an illustration of a bottom right side perspective view of an exemplary version of a support system 12 of the disclosure, showing the one-piece co-molded snap-on apparatuses 10, such as the one-piece co-molded snap-on apparatuses 10a, of FIG. 5B, with the ring post 72, such as in the form of the 4-ring ring post 72d, with the four rings 114, such as the first ring 114a, the second ring 114b, the third ring 114c, and the fourth ring 114d, on the ring post body 118, installed on the elongate bar structure 42, and showing three centering elements 106 and an elongate element 26 attached to the second rings 114b of the ring posts 72 of the one-piece co-molded snap-on apparatuses 10.

As shown in FIG. 10, each one-piece co-molded snap-on apparatus 10 comprises the ring post 72, such as in the form of the 4-ring ring post 72d, with the four rings 114 on the ring post body 118, co-molded to, and integral with the snap-on attachment base 78 and installed on the elongate bar structure 42, via the snap-on attachment 80 (see FIG. 1), such as the one-step snap-on attachment 80a (see FIG. 1). As shown in FIG. 10, the snap-on attachment base 78 of each of the one-piece co-molded snap-on apparatuses 10 comprises the top support portion 84 integral with the ring post 72, and the top support portion 84 has the curved support surface elements 86. As further shown in FIG. 10, the snap-on attachment base 78 comprises the bottom attachment portion 88 integral with the top support portion 84, and the bottom attachment portion 88 has side arms 90 opposite each other and designed to snap fit against opposing sides 52 of the elongate bar structure 42. As shown in FIG. 10, each side arm 90 has the snap-fit edge portion 92 with the topmost surface 96 fitted against the bottommost surfaces 56c of the elongate bar structure 42. FIG. 10 shows the two through openings 100 and two indentations 102 in each side arm 90.

FIG. 10 further shows an elongate element 26, such as an elongate conductive element 26a, for example, a cable 36, such as a current return network cable 36b, attached to a ring 114, such as the second ring 114b, of each ring post 72, such as the 4-ring ring post 72d, via a fastener device 138, such as a cable tie 138b. As shown in FIG. 10, the cable 36, such as the current return network cable 36b, comprises termination portions 202 for connecting to another electrical conducting surface or mating connector. A hole 204 (see FIG. 10) in each termination portion 202 is configured to receive a fastener or attachment element (not shown) to make an electrical connection with another surface. For example, smaller wires may use pins inserted in a connector, which attaches to another connector to continue a circuit. The cable 36, such as the current return network cable 36b, may be used for an electrical ground system on a vehicle 30 (see FIG. 1), such as an aircraft 30a (see FIG. 1). The cable 36, such as the current return network cable 36b, is an example of an elongate element 26 that may be attached and routed to the ring post 72 of the one-piece co-molded snap-on apparatus 10 in the support system 12. Other types of elongate elements 26 may also be attached and routed to the ring post 72 of the one-piece co-molded snap-on apparatus 10.

FIG. 10 further shows each one-piece co-molded snap-on apparatus 10 having three (3) centering elements 106 inserted through three (3) holes 62 in the elongate bar structure 42, such as the spanner bar 44, to properly align and center each one-piece co-molded snap-on apparatus 10 on the elongate bar structure 42, such as the spanner bar 44. As shown in FIG. 10, the elongate bar structure 42, such as in the form of the spanner bar 44, for example, the linear spanner bar 44a, has holes 62, such as through holes, that define registration points 63 formed through the central portion 64 of the elongate body 50 of the elongate bar structure 42, such as the spanner bar 44. As shown in FIG. 10, the elongate bar structure 42, such as in the form of the spanner bar 44, has the slot opening 68 formed through the central portion 64 of the elongate body 50 of the elongate bar structure 42, such as the spanner bar 44.

As shown in FIG. 10, the one-piece co-molded snap-on apparatuses 10 are attached to portions 42a of the elongate bar structure 42 with the one-step snap-on attachment 80a (see FIG. 1). In particular, as shown in FIG. 10, the side arms 90 and the snap-fit edge portions 92 of the bottom attachment portion 88 of the snap-on attachment base 78 of the one-piece co-molded snap-on apparatuses 10 are attached to the portions 42a of the elongate bar structure 42, such as the spanner bar 44, with the topmost surface 96 of the snap-fit edge portions 92 engaged and fitted against the bottommost surfaces 56c of the elongate bar structure 42.

Figure 11:
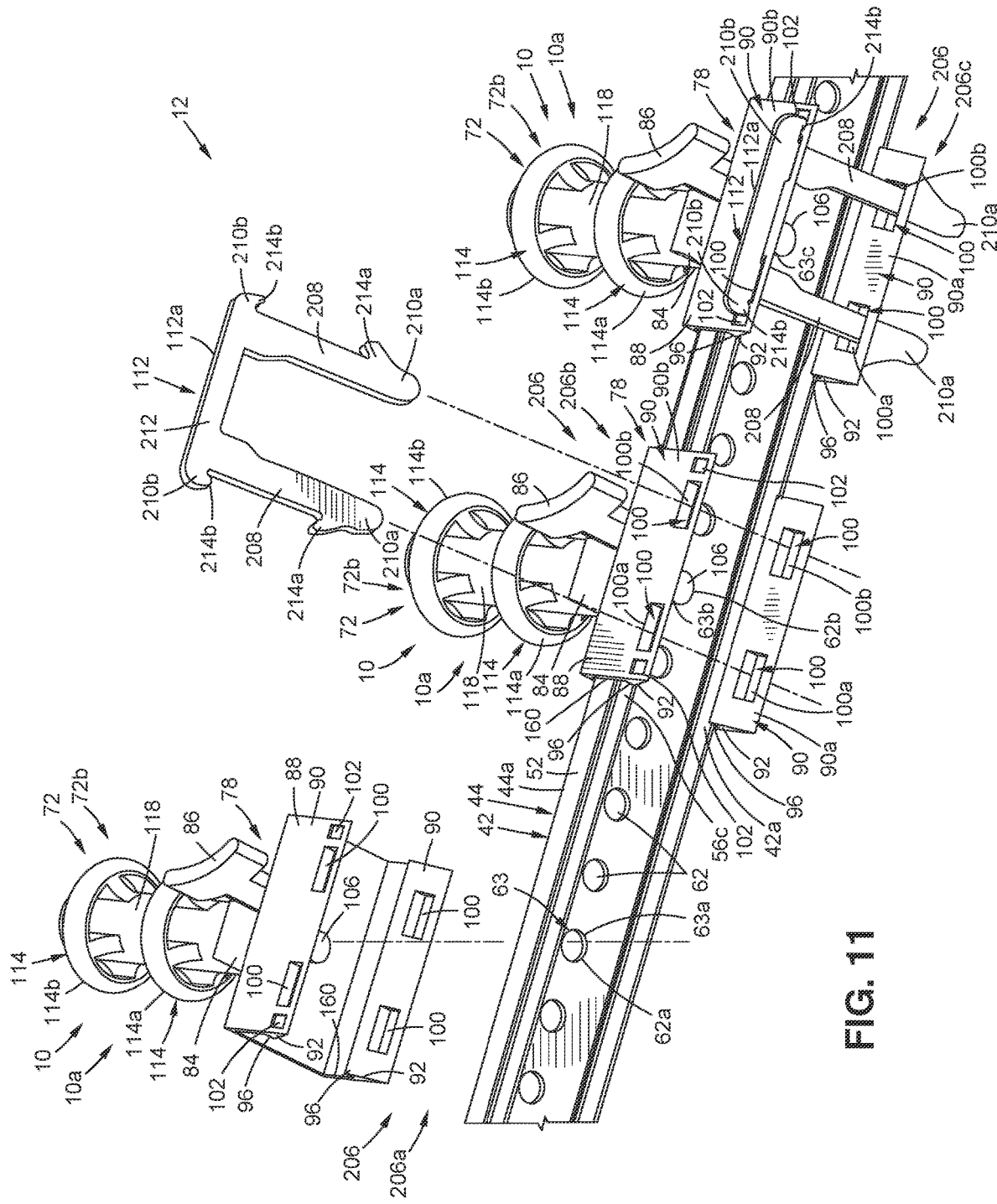
FIG. 11 is an illustration of a bottom right side perspective view of an exemplary version of a support system of the disclosure, showing multiple one-piece co-molded snap-on apparatuses in different installation positions with respect to the elongate bar structure.

Now referring to FIG. 11, FIG. 11 is an illustration of a bottom right side perspective view of an exemplary version of a support system 12 of the disclosure, showing multiple one-piece co-molded snap-on apparatuses 10, such as one-piece co-molded snap-on apparatuses 10a, of FIG. 2A, with the ring post 72, such as in the form of the 2-ring ring post 72b, with the two rings 114, such as the first ring 114a and the second ring 114b, on the ring post body 118, in different installation positions 206, or different stages of assembly, with respect to the elongate bar structure 42, such as the spanner bar 44. As shown in FIG. 11, the elongate bar structure 42, such as the spanner bar 44, has holes 62 that define registration points 63.

As shown in FIG. 11, each one-piece co-molded snap-on apparatus 10 comprises the ring post 72, such as in the form of the 2-ring ring post 72b, with the two rings 114 on the ring post body 118, co-molded to, and integral with, the snap-on attachment base 78 and designed for the snap-on attachment 80 (see FIG. 1), such as the one-step snap-on attachment 80a (see FIG. 1), to the elongate bar structure 42. As shown in FIG. 11, the snap-on attachment base 78 of each of the one-piece co-molded snap-on apparatuses 10 comprises the top support portion 84 co-molded with, and integral with, the ring post 72, and the top support portion 84 has the curved support surface elements 86. As further shown in FIG. 11, the snap-on attachment base 78 comprises the bottom attachment portion 88 integral with the top support portion 84, and the bottom attachment portion 88 has side arms 90 opposite each other and designed to snap fit against opposing sides 52 of the elongate bar structure 42. As shown in FIG. 11, each side arm 90 has the snap-fit edge portion 92 with the topmost surface 96. FIG. 11 shows the two through openings 100 and two indentations 102 in each side arm 90.

As shown in FIG. 11, in the installation position 206 comprising a first installation position 206a, the one-piece co-molded snap-on apparatus 10 is positioned over the elongate bar structure 42, such as the spanner bar 44, so that the centering element 106 is aligned with a hole 62a to define a registration point 63a on the elongate bar structure 42, such as the spanner bar 44.

As further shown in FIG. 11, in the installation position 206 comprising a second installation position 206b, the snap-on attachment base 78 of the one-piece co-molded snap-on apparatus 10 is snapped onto a portion 42a of the elongate bar structure 42, such as the spanner bar 44, in the snap-on attachment 80, such as the one-step snap-on attachment 80a, such that the centering element 106 is received into the hole 62b defining the registration point 63b in the elongate bar structure 42, such as the spanner bar 44. Further, in the second installation position 206b, the inner sides 160 of the first side arm 90a and the second side arm 90b of the snap-on attachment base 78 engage or press against the opposing sides 52 of the elongate bar structure 42, such as the spanner bar 44, and the topmost surface 96 of each snap-fit edge portion 92 engages and fits against the bottommost surface 56c of the elongate bar structure 42, such as the spanner bar 44.

The one-piece co-molded snap-on apparatus 10 is sufficiently secured to the elongate bar structure 42, such as the spanner bar 44. However, the bottom attachment portion 88 of the snap-on attachment base 78 of the one-piece co-molded snap-on apparatus 10 may be further secured to the elongate bar structure 42, such as the spanner bar 44, with the use of an installation clip 112 (see FIG. 11), such as a J-clip 112a. As shown in FIG. 11, the installation clip 112 has legs 208 with first hook portions 210a at the bottom end and second hook portions 210b at the top end, and a bridge portion 212 spanning between the legs 208, and from which the legs 208 extend downwardly, or away from. As shown in FIG. 11, the first hook portions 210a of the legs 208 are aligned with the through openings 100, such as the first through openings 100a and the second through openings 100b, in the first side arm 90a and the second side arm 90b of the bottom attachment portion 88. The first hook portions 210a include tips 214a (see FIG. 11), and the second hook portions 210b include tips 214b (see FIG. 11).

As shown in FIG. 11, in the installation position 206 comprising a third installation position 206c, the legs 208 and the first hook portions 210a of the installation clip 112, such as the J-clip 112a, are inserted through the first through openings 100a and the second through openings 100b of the first side arm 90a and the second side arm 90b, and the tips 214a of the first hook portions 210a engage the indentations 102 on the first side arm 90a, and tips 214b of the second hook portions 210b engage the indentations 102 on the second side arm 90b. The installation clip 112 may be removed by pressing the legs 208 towards each other such that the first hook portions 210a can be pushed through the through opening 100 in a reverse process.

As shown in FIG. 11, the one-piece co-molded snap-on apparatuses 10 are spaced along the length of the elongate bar structure 42, such as the spanner bar 44, at desired intervals. In one version, the elongate bar structure 42, such as the spanner bar 44, is about 18 (eighteen) inches long, and may accommodate 4 (four) to 6 (six) one-piece co-molded snap-on apparatuses 10. However, the length of the elongate bar structure 42, such as the spanner bar 44, may vary, as well as the size and/or amount of one-piece co-molded snap-on apparatuses 10 and the desired spacing of the one-piece co-molded snap-on apparatuses 10 along the elongate bar structure 42, such as the spanner bar 44.

Figure 12:
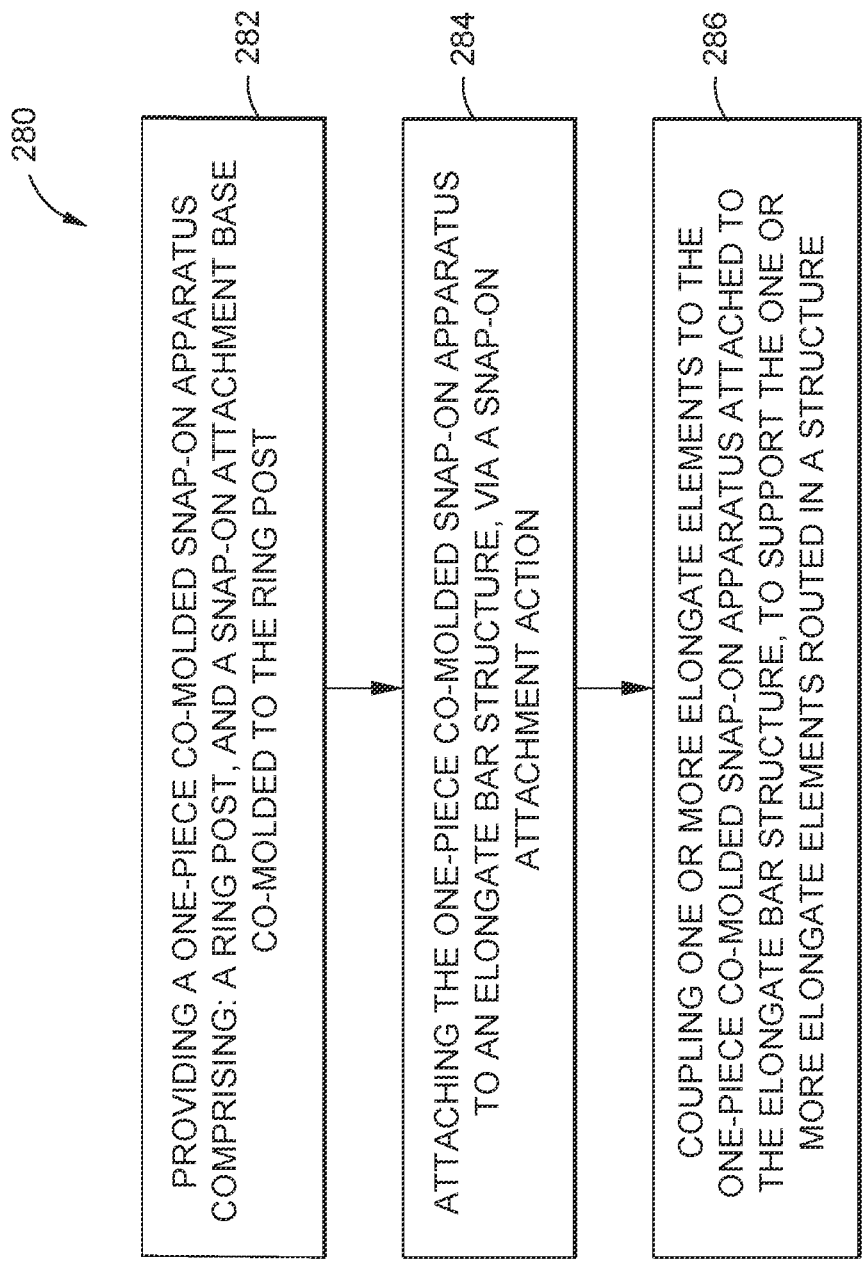
FIG. 12 is an illustration of a flow diagram of an exemplary version of a method of the disclosure.

Now referring to FIG. 12, FIG. 12 is an illustration of a flow diagram of an exemplary version of a method 280 of the disclosure. In another version of the disclosure, there is provided the method 280 of using the one-piece co-molded snap-on apparatus 10 (see FIGS. 1, 2A, 5A), discussed in detail above, to support one or more elongate elements 26 (see FIG. 1) routed in a structure 14 (see FIG. 1), to reduce a time 18 (see FIG. 1) of installation 20 (see FIG. 1) of the one-piece co-molded snap-on apparatuses 10 for routing 24 (see FIG. 1), and supporting, the elongate elements 26, such as on a harness 28 (see FIG. 1), in a vehicle 30 (see FIGS. 1, 13), such as an aircraft 30a (see FIGS. 1, 13), for example, a commercial aircraft 30b (see FIGS. 1, 13), a rotorcraft 30c (see FIG. 1), a spacecraft 30d (see FIG. 1), a watercraft 30e (see FIG. 1), an automobile 30f (see FIG. 1), or other suitable vehicles, or in an architectural structure 32 (see FIG. 1), such as a building 32a (see FIG. 1), a dwelling, a warehouse, or another suitable architectural structure.

The blocks in FIG. 12 represent operations and/or portions thereof, or elements, and lines connecting the various blocks do not imply any particular order or dependency of the operations or portions thereof, or elements. FIG. 12 and the disclosure of the steps of the method 280 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 12, the method 280 comprises the step of providing 282 the one-piece co-molded snap-on apparatus 10, as discussed in detail above. The one-piece co-molded snap-on apparatus 10 comprises the ring post 72 (see FIGS. 1, 2A-7), and a snap-on attachment base 78 (see FIGS. 1, 2A) co-molded to the ring post 72 to form the one-piece co-molded snap-on apparatus 10. Instead of the ring post 72, the snap-on attachment base 78 may be co-molded with a monument 74 (see FIGS. 1, 8A-8B). The snap-on attachment base 78 comprises a top support portion 84 (see FIGS. 1, 2A) co-molded with, and integral with, the ring post 72 or the monument 74. The top support portion 84 has curved support surface elements 86 (see FIGS. 1, 2A) on opposite sides 87 (see FIG. 2A) of the top support portion 84.

The snap-on attachment base 78 further comprises a bottom attachment portion 88 (see FIGS. 1, 2A) integral with, and co-molded with, the top support portion 84. The bottom attachment portion 88 has side arms 90 (see FIGS. 1, 2A) opposite each other, and the bottom attachment portion 88 is designed to snap fit against opposing sides 52 (see FIG. 9A) of the elongate bar structure 42 (see FIG. 9A). Each side arm 90 has a snap-fit edge portion 92 (see FIGS. 1, 2A) formed at a bottom end 94 (see FIGS. 1, 2A) of each side arm 90. Each snap-fit edge portion 92 has a topmost surface 96 (see FIGS. 1, 2A) designed to fit against a bottommost surface 56c (see FIG. 9A) of the elongate bar structure 42. Each snap-fit edge portion 92 further has a triangular shape 98 (see FIGS. 1, 2A) and has at least two through openings 100 (see FIGS. 1, 2A).

The snap-on attachment base 78 further comprises at least one centering element 106 (see FIGS. 1, 2B, 2F-2H) projecting from an interior surface 108 (see FIGS. 1, 2B) of the snap-on attachment base 78 into a channel 110 (see FIGS. 1, 2B) formed between the side arms 90. The at least one centering element 106 (see FIG. 9B) is designed to mate with at least one hole 62 (see FIG. 9B) in the elongate bar structure 42 (see FIG. 9B) to center the one-piece co-molded snap-on apparatus 10 on the elongate bar structure 42.

The step of providing 282 the one-piece co-molded snap-on apparatus 10 further comprises, providing the one-piece co-molded snap-on apparatus 10 having the ring post 72 comprising the 1-ring ring post 72a (see FIG. 3) having 1 (one) ring 114, the 2-ring ring post 72b (see FIG. 2A) having 2 (two) rings 114, the 3-ring ring post 72c (see FIG. 4) having 3 (three) rings 114, the 4-ring ring post 72d (see FIG. 5A) having 4 (four) rings 114, the 5-ring ring post 72e (see FIG. 6) having 5 (five) rings 114, or the 6-ring ring post 72f (see FIG. 7) having 6 (six) rings 114. Each ring 114 has through openings 136 (see FIG. 2E), or slots, and spokes 134 (see FIG. 2E) separating the through openings 136, or slots. Where the ring post 72 has two or more rings 114, the rings 114 are tiered in a tiered alignment 126 (see FIG. 2A) with each other and with the elongate bar structure 42.

The step of providing 282 the one-piece co-molded snap-on apparatus 10 may further comprise, flattening one or more edges of one or more rings 114 of the ring post 72, to obtain one or more flat side portions, to prevent wear on the elongate elements 26, such as a cable 36 (see FIG. 10), such as a current return network cable 36b (see FIG. 10, and/or the harness 28 (see FIG. 1) bundling the cables 36 or wires 34 (see FIG. 1), adjacent one or more rings 114, such as one or more flattened side rings 115 (see FIG. 1). In this version of the ring post 72, each ring 114 of the ring post 72 has one or more flat side portions, to reduce or prevent wear on the elongate elements 26, such as the cables 36, or wires 34, and/or the harness 28 adjacent the ring 114, such as the flattened side ring 115.

In another version, the ring post 72 may have an insert 76 (see FIG. 2I), such as a metal rod insert 76a (see FIG. 2I), disposed in a center interior 124a (see FIG. 2I) of the ring post body 118 of the ring post 72, along a length of the ring post 72, and through a center interior 179 (see FIG. 2I) of the top support portion 84 (see FIG. 2I), to provide support and reinforcement to the ring post 72.

As shown in FIG. 12, the method 280 further comprises the step of attaching 284 the one-piece co-molded snap-on apparatus 10 to the elongate bar structure 42 (see FIG. 9A), via a snap-on attachment action 82 (see FIG. 1).

The step of attaching 284 the one-piece co-molded snap-on apparatus 10 to the elongate bar structure 42 further comprises attaching an installation clip 112 (see FIGS. 1, 11) through the at least two through openings 100 (see FIGS. 1, 2A) in each side arm 90 of the bottom attachment portion 88 of the snap-on attachment base 78, to further secure the one-piece co-molded snap-on apparatus 10 to the elongate bar structure 42. The installation clip 112 may comprise a J-clip 112a (see FIG. 11). The step of attaching 284 the one-piece co-molded snap-on apparatus 10 to the elongate bar structure 42 further comprises engaging tips 214b (see FIG. 11) of the installation clip 112 (see FIG. 11), such as the J-clip 112a (see FIG. 11), with at least two indentations 102 (see FIGS. 1, 2A, 11) formed on an exterior 104 (see FIGS. 1, 2A) of the snap-fit edge portion 92 of each side arm 90 of the bottom attachment portion 88 of the snap-on attachment base 78.

The step of attaching the one-piece co-molded snap-on apparatus 10 to the elongate bar structure 42 further comprises attaching the snap-fit edge portion 92 of each side arm 90 in a snap-on attachment 80 (see FIG. 1), such as a one-step snap-on attachment 80a (see FIG. 1), to a portion 42a (see FIG. 1) of the elongate bar structure 42, so that the topmost surface 96 of the snap-fit edge portion 92 fits against a bottommost surface 56c of the elongate bar structure 42. The portion 42a of the elongate bar structure 42 is secured between the first side arm 90a (see FIG. 9A) and the second side arm 90b (see FIG. 9A) of the bottom attachment portion 88 of the snap-on attachment base 78, when the snap-on attachment base 78 of the one-piece co-molded snap-on apparatus 10 is attached to, and installed on, the elongate bar structure 42.

The step of attaching the one-piece co-molded snap-on apparatus 10 to the elongate bar structure 42 further comprises mating the one or more centering elements 106 with the one or more holes 62 on the elongate bar structure 42, by inserting the one or more centering elements 106 on the interior surface 108 (see FIG. 2B) into the one or more holes 62 on the elongate bar structure 42, to align and secure the one-piece co-molded snap-on apparatus 10 to the elongate bar structure 42.

The step of attaching the one-piece co-molded snap-on apparatus 10 to the elongate bar structure 42 further comprises attaching or installing the one-piece co-molded snap-on apparatus 10 on the elongate bar structure 42 at a reduced installation time 22 (see FIG. 1) of five (5) seconds per one-piece co-molded snap-on apparatus 10, as compared to a one (1) minute time 18 of installation 20 (see FIG. 1) per a known ring post assembly attached to a spanner bar using one or more fastener devices, or per a known monument assembly attached to a spanner bar with a locking bar and an installation clip.

As shown in FIG. 12, the method 280 further comprises the step of coupling 286 the one or more elongate elements 26 to the one-piece co-molded snap-on apparatus 10 attached to the elongate bar structure 42, to support the one or more elongate elements 26 routed in the structure 14. The step of coupling 286 the one or more elongate elements 26 to the one-piece co-molded snap-on apparatus 10 attached to the elongate bar structure 42 further comprises one or more of, coupling the one or more elongate elements 26, as shown in FIG. 1, comprising one or more of, wires 34; cables 36, including electrical cables 36a, current return network cables 36b, data bus cables 36c, fiber optic cables 36d, high speed transmission cables 36e, and coaxial cables 36f; tubes 38; and hoses 40, or coupling a harness 28 bundling the one or more elongate elements 26. The one-piece co-molded snap-on apparatus 10 is attached to the elongate bar structure 42 without the use of tools or fasteners.

The elongate bar structure 42 may be attached to, and in, the vehicle 30 or to, and in, an architectural structure 32. The step of coupling 286 the one or more elongate elements 26 to the one-piece co-molded snap-on apparatus 10 attached to the elongate bar structure 42 further comprises coupling the one or more elongate elements 26 to the one-piece co-molded snap-on apparatus 10 attached to the elongate bar structure 42, to support the one or more elongate elements 26 routed in the structure 14, such as shown in FIG. 1, comprising the vehicle 30, including the aircraft 30a, such as a commercial aircraft 30b, a rotorcraft 30c, a spacecraft 30d, a watercraft 30e, an automobile 30f, or another suitable vehicle, or an architectural structure 32, including a building 32a, an office, a dwelling, a warehouse, or another suitable architectural structure.

Figure 13:
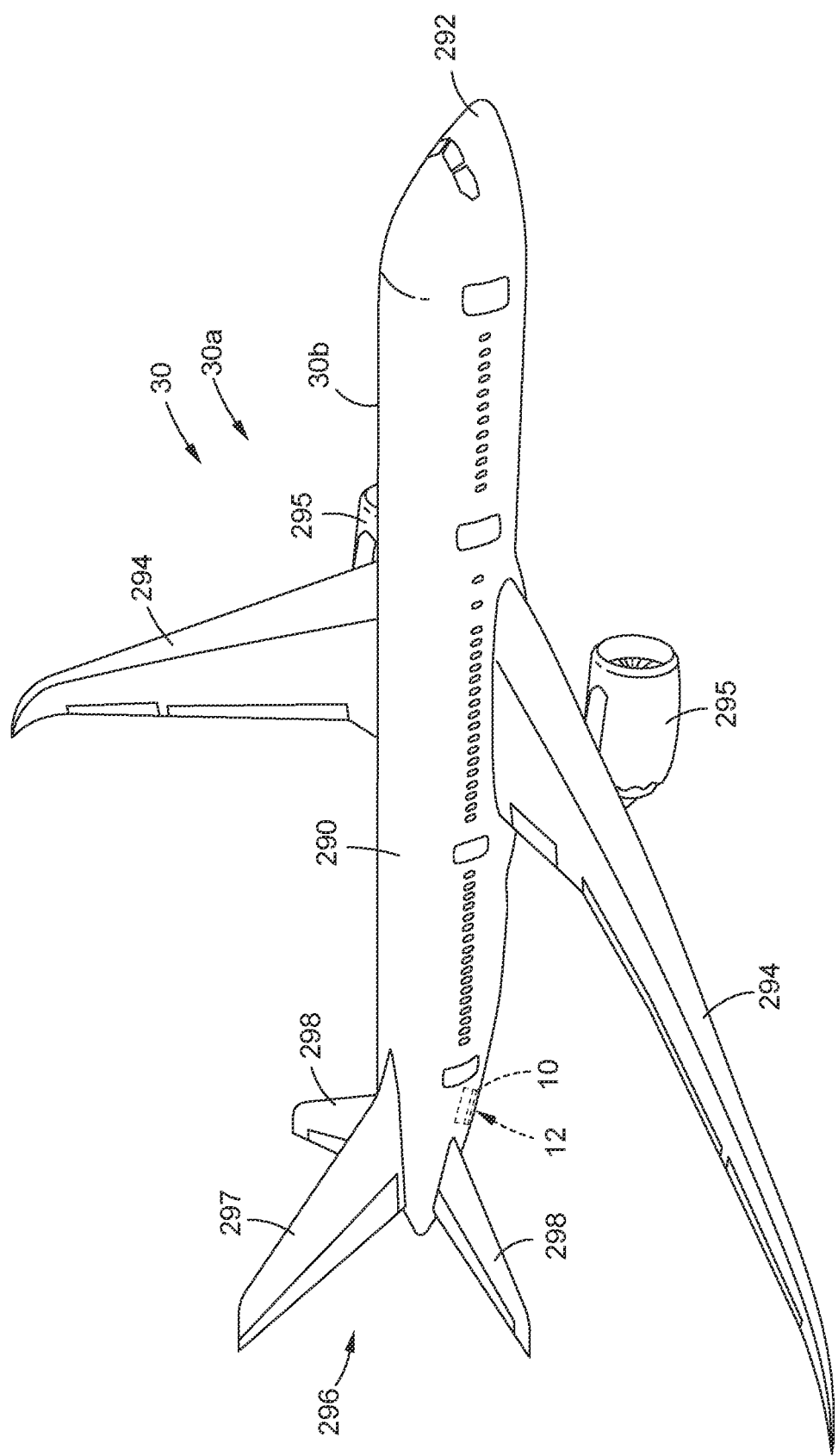
FIG. 13 is an illustration of a perspective view of an aircraft incorporating one or more versions of a support system of the disclosure.

Now referring to FIG. 13, FIG. 13 is an illustration of a perspective view of a vehicle 30, such as an aircraft 30a, for example, a commercial aircraft 30b, incorporating one or more version of a support system 12 with the one-piece co-molded snap-on apparatuses 10, as discussed above. As shown in FIG. 13, the vehicle 30, such as the aircraft 30a, for example, the commercial aircraft 30b, includes a fuselage 290, a nose 292, wings 294, engines 295, and an empennage 296. As shown in FIG. 13, the empennage 296 comprises a vertical stabilizer 297 and horizontal stabilizers 298. In one illustrative version, as shown in FIG. 13, the support system 12 with the one-piece co-molded snap-on apparatuses 10 is shown installed in a cargo section of the vehicle 30, such as the aircraft 30a, for example, the commercial aircraft 30b. The vehicle 30 may also include rotorcraft 30c (see FIG. 1), spacecraft 30d (see FIG. 1), watercraft 30e (see FIG. 1), automobiles 30f (see FIG. 1), and other suitable vehicles. The support system 12 with the one-piece co-molded snap-on apparatuses 10 may also be installed in an architectural structure 32 (see FIG. 1), such as a building 32a (see FIG. 1), or other suitable architectural structures.

Figure 14:
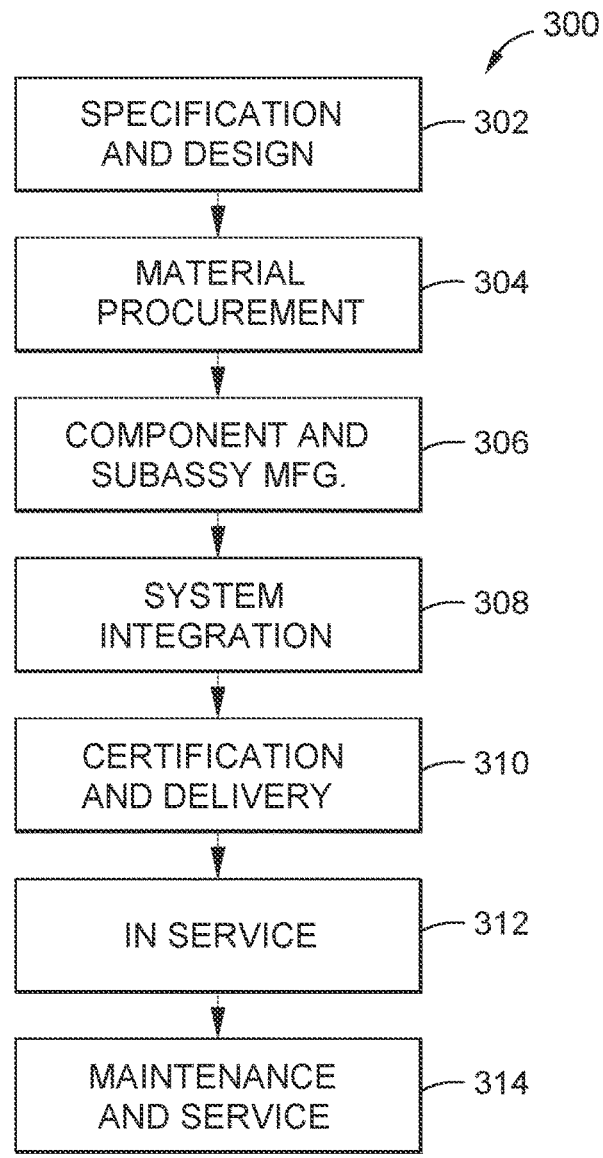
FIG. 14 is an illustration of a flow diagram of an exemplary aircraft manufacturing and service method.
Figure 15:
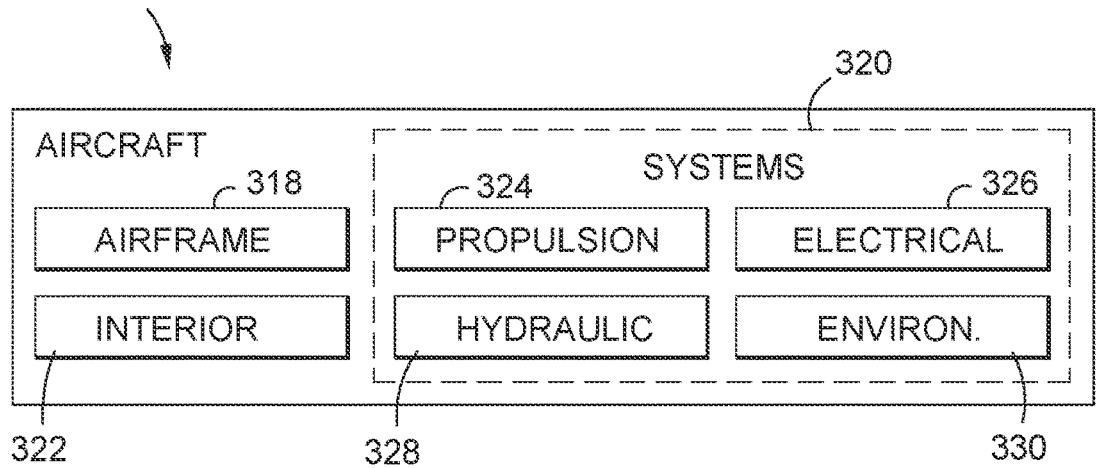
FIG. 15 is an illustration of an exemplary block diagram of an aircraft.

Now referring to FIGS. 14 and 15, FIG. 14 is an illustration of a flow diagram of an exemplary aircraft manufacturing and service method 300, and FIG. 18 is an illustration of an exemplary block diagram of an aircraft 316. Referring to FIGS. 14 and 15, versions of the disclosure may be described in the context of the aircraft manufacturing and service method 300 as shown in FIG. 14, and the aircraft 316 as shown in FIG. 15.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 15, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the one-piece co-molded snap-on apparatus 10 (see FIGS. 1, 2A, 5A, 8A), the support system 12 (see FIGS. 1, 10, 11), and the method 280 (see FIG. 12) provide for one-piece co-molded snap-on apparatus 10 with a ring post 72 (see FIG. 1) or a monument 74 (see FIG. 1) co-molded to, and integral with, a snap-on attachment base 78 (see FIGS. 1, 2A) designed for a one-step snap-on attachment 80a (see FIG. 1) to an elongate bar structure 42 (see FIGS. 1, 9A). The snap-on attachment base 78 comprises a top support portion 84 (see FIGS. 1, 2A) integral with the ring post 72 or monument 74, and bottom attachment portion 88 (see FIGS. 1, 2A) integral with the top support portion 84. The bottom attachment portion 88 has side arms 90 (see FIGS. 1, 2A) opposite each other and designed to snap fit against opposing sides 52 (see FIG. 9A) of the elongate bar structure 42. Each side arm 90 has a snap-fit edge portion 92 (see FIGS. 1, 2A) formed at a bottom end 94 (see FIG. 1) of each side arm 90. Each snap-fit edge portion 92 has a topmost surface 96 (see FIGS. 1, 2A) designed to fit against a bottommost surface 56c (see FIG. 9B) of the elongate bar structure 42, and each snap-fit edge portion 92 further has a triangular shape 98 (see FIG. 1) and has at least two through openings 100 (see FIGS. 1, 2A). The snap-on attachment base 78 further comprises at least one centering element 106 (see FIGS. 1, 2B) projecting from an interior surface 108 (see FIGS. 1, 2B) of the snap-on attachment base 78 into a channel 110 (see FIGS. 1, 2B) formed between the side arms 90. The at least one centering element 106 is designed to mate with at least one hole 62 (see FIGS. 9A-9B) in the elongate bar structure 42 (see FIGS. 9A-9B) to center the one-piece co-molded snap-on apparatus 10 on the elongate bar structure 42. The one-piece co-molded snap-on apparatus 10 provides a single piece, co-molded component with a locking base that is attached to the elongate bar structure 42, such as a spanner bar 44 (see FIGS. 9A-9B) without the use of fasteners, screws, washers, and nuts to secure the ring posts 72 or the monuments 74. The one-piece component has a snap-on attachment base 78 for securing the ring post 72 or the monument 74 to the elongate bar structure 42, such as the spanner bar. The ring post 72 or the monument 74 is co-molded to the snap-on attachment base 78 to provide a one-piece design with a one-step snap-on attachment 80a (see FIG. 1). The one-piece co-molded snap-on apparatus 10 and the support system 12 eliminate the use of fasteners, screws, washers, and nuts to secure a base to the elongate bar structure 42, such as a spanner bar 44, in an aircraft 30a (see FIGS. 1, 13), so that it reduces complexity and weight on the aircraft 30a by eliminating parts and tools. The invention also improves installation cycle time because the mechanic will have fewer components to assemble. Since the ring post 72 or the monument 74 is co-molded to, and integral with, the snap-on attachment base 78 to form the one-piece co-molded snap-on apparatus 10, it avoids attaching together separate ring posts 72 or monuments 74 and separate bases, thus saving time and labor costs for installation.

In addition, disclosed versions of the one-piece co-molded snap-on apparatus 10 (see FIGS. 1, 2A, 5A), the support system 12 (see FIGS. 1, 10, 11), and the method 280 (see FIG. 12) provide for a one-piece co-molded snap-on apparatus 10 that is easy to manufacture, quick to install and remove, and is less complex to install and assemble since no, or a reduced number of, tools and hardware are needed. For example, the one-piece co-molded snap-on apparatus 10 does not require the use of added fasteners, washers, nuts, or other fastener assembly components to attach the ring posts 72 or monuments 74 to, and under, the spanner bar 44, and thus weight to the vehicle 30, such as the aircraft 30a, is reduced. Moreover, manually rotating ring posts to the spanner bar 44, threadably coupling ring posts to the spanner bar 44, and attaching the ring posts on the bottom side of the spanner bar 44 with fasteners, washers, and nuts to secure the ring posts, is avoided with use of the one-piece co-molded snap-on apparatus 10 disclosed herein. Further, disclosed versions of the one-piece co-molded snap-on apparatus 10 (see FIGS. 1, 2A, 5A), the support system 12 (see FIGS. 1, 10, 11), and the method 280 (see FIG. 12) do not require the use of numerous tools, such as drills, screwdrivers, wrenches, or other tools, that may be needed to build a ring post stack-up on the spanner bar 44, or that may be needed to attach the ring post or monument to the spanner bar 44. The use of the one-piece co-molded snap-on apparatus 10 avoids the use of numerous tools, and thus avoids the need for tracking and/or calibration of such tools, and avoids the risk of lost tools in a manufacturing area. This allows for the assembly and routing of elongate elements 26, such as wires 34 (see FIG. 1) and cables 36 (see FIG. 1), and harnesses 28 for bundling the elongate elements 26, to be installed and completed much more quickly and efficiently, while also removing weight from the vehicle 30 (see FIG. 1), such as an aircraft 30a (see FIGS. 1, 13), by eliminating or reducing the use of clips, fasteners, washers, nuts, and other hardware used to secure known monuments and ring posts to the elongate bar structure 42, such as the spanner bar 44, in the vehicle 30, such as the aircraft 30a. This results in less Foreign Object Debris (FOD) instances on an aircraft 30a and less ergonomic issues during installation.

In addition, disclosed versions of the one-piece co-molded snap-on apparatus 10 (see FIGS. 1, 2A, 5A), the support system 12 (see FIGS. 1, 10, 11), and the method 280 (see FIG. 12) reduce the time 18 (see FIG. 1) of installation 20 (see FIG. 1) of the one-piece co-molded snap-on apparatus 10, to obtain a reduced installation time 22 (see FIG. 1) for routing and attaching the elongate elements 26, such as wires 34 (see FIG. 1) and cables 36 (see FIG. 1), and harnesses 28 for bundling the elongate elements 26. The one-piece co-molded snap-on apparatus 10 clips on easily to a wire harness assembly spanner bar and has the ring post 72 feature co-molded with the snap-on attachment base 78 and with all configurations required to mount an electrical wire harness. This results in a significant decrease in the time 18 of installation 20, and assembly and labor to install and assemble, and in turn, may result in significant cost savings during manufacture and assembly. For example, installing the one-piece co-molded snap-on apparatus 10 of the disclosure on the elongate bar structure 42 has a reduced installation time 22 of five (5) seconds per one-piece co-molded snap-on apparatus 10, that includes the snap-on attachment base 78 co-molded to the ring post 72 or monument 74, as compared to a one (1) minute installation time per a known ring post assembly attached to a spanner bar, or per a known monument assembly attached to a spanner bar using one or more tools and fastener devices. Moreover, the ergonomics of installation of the one-piece co-molded snap-on apparatus 10 of the disclosure use one motion per installation of the one-piece co-molded snap-on apparatus 10. Thus, the ergonomics of installation of the one-piece co-molded snap-on apparatus 10 may be improved with less motions involved than with installation of known assemblies.

Moreover, disclosed versions of the one-piece co-molded snap-on apparatus 10 (see FIGS. 1, 2A, 5A), the support system 12 (see FIGS. 1, 10, 11), and the method 280 (see FIG. 12) do not require "clocking" of the ring posts 72, when stacking the ring posts 72 together, since versions of the ring posts 72 used in the support system 12 include ring posts 72 having from 1 to 6 rings 114 co-molded to the snap-on attachment base 78 to arrive at the one-piece co-molded snap-on apparatus 10 for attachment to the elongate bar structure 42, such as the spanner bar 44. This avoids the extensive time and labor involved in correctly clocking the ring posts, and may result in decreased manufacturing and assembly costs.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A one-piece co-molded snap-on apparatus for supporting one or more elongate elements, the one-piece co-molded snap-on apparatus comprising:
   a ring post comprising one or more rings, each of the one or more rings having an inner circumference and an outer circumference, and a ring body, and wherein each of the one or more rings is integral with, and spaced from, a ring post body, via radially extending spokes, positioned between portions of an exterior of the ring post body and the ring body; and
   a snap-on attachment base co-molded to the ring post to form the one-piece co-molded snap-on apparatus designed for a snap-on attachment to an elongate bar structure, the snap-on attachment base comprising:
      a top support portion integral with the ring post, the top support portion having curved support surface elements on opposite sides of the top support portion;
      a bottom attachment portion integral with the top support portion, the bottom attachment portion having side arms opposite each other and designed to snap fit against opposing sides of the elongate bar structure, each side arm having a snap-fit edge portion formed at a bottom end of each side arm, each snap-fit edge portion having a topmost surface designed to fit against a bottommost surface of the elongate bar structure, and each snap-fit edge portion further having a triangular shape and having at least two through openings, each through opening formed through an outer side of the snap-fit edge portion and through a slope side of the snap-fit edge portion; and
      at least one centering element projecting from an interior surface of the snap-on attachment base into a channel formed between the side arms, the at least one centering element designed to mate with at least one hole in the elongate bar structure to center the one-piece co-molded snap-on apparatus on the elongate bar structure,
   wherein the one-piece co-molded snap-on apparatus supports the one or more elongate elements routed in a structure.

2. The one-piece co-molded snap-on apparatus of claim 1, wherein two or more of the one or more rings are tiered in a tiered alignment with each other and with the elongate bar structure.

3. The one-piece co-molded snap-on apparatus of claim 2, wherein the ring post comprises one ring, two rings, three rings, four rings, five rings, or six rings.

4. The one-piece co-molded snap-on apparatus of claim 2, wherein the one-piece co-molded snap-on apparatus is made of one or more plastic materials comprising thermoplastic, thermoplastic polyamide nylon, nylon, polyamide, polyetherimide, polyetheretherketone (PEEK), or polyetherketone (PEK).

5. The one-piece co-molded snap-on apparatus of claim 1, wherein the ring post has a metal rod insert disposed in an interior of a ring post body of the ring post, to provide support and reinforcement to the ring post.

6. The one-piece co-molded snap-on apparatus of claim 1, wherein the ring post is substituted with a monument co-molded to the snap-on attachment base.

7. The one-piece co-molded snap-on apparatus of claim 1, wherein the curved support surface elements of the top support portion are further designed to support a harness bundling the one or more elongate elements.

8. The one-piece co-molded snap-on apparatus of claim 1, wherein each side arm further comprises at least two indentations formed on an exterior of the snap-fit edge portion of each side arm.

9. The one-piece co-molded snap-on apparatus of claim 1, wherein the at least one centering element comprises one centering element, two centering elements, or three centering elements projecting from the interior surface of the snap-on attachment base.

10. The one-piece co-molded snap-on apparatus of claim 1, wherein the one-piece co-molded snap-on apparatus supports the one or more elongate elements routed in the structure comprising a vehicle, including an aircraft, a rotorcraft, a spacecraft, a watercraft, or an automobile, or an architectural structure, including a building.

11. A support system for an aircraft, the support system having one or more one-piece co-molded snap-on apparatuses for supporting one or more elongate elements routed in the aircraft, the support system comprising:
   one or more elongate bar structures;
   the one or more one-piece co-molded snap-on apparatuses, each comprising:
      a ring post comprising one or more rings, each of the one or more rings having an inner circumference and an outer circumference, and a ring body, and wherein each of the one or more rings is integral with, and spaced from, a ring post body, via radially extending spokes, positioned between portions of an exterior of the ring post body and the ring body; and a snap-on attachment base co-molded to the ring post to form the one-piece co-molded snap-on apparatus designed for a snap-on attachment to one of the one or more elongate bar structures, the snap-on attachment base comprising:

a top support portion integral with the ring post, the top support portion having curved support surface elements on opposite sides of the top support portion, and designed to support one or more of the one or more elongate elements;

a bottom attachment portion integral with the top support portion, the bottom attachment portion having side arms opposite each other and designed to snap fit against opposing sides of the elongate bar structure, each side arm having a snap-fit edge portion formed at a bottom end of each side arm, each snap-fit edge portion having a topmost surface designed to fit against a bottommost surface of one of the one or more elongate bar structures, and each snap-fit edge portion further having a triangular shape and having at least two through openings, each through opening formed through an outer side of the snap-fit edge portion and through a slope side of the snap-fit edge portion; and at least one centering element projecting from an interior surface of the snap-on attachment base into a channel formed between the side arms, the at least one centering element designed to mate with at least one hole in one of the one or more elongate bar structures to center each of the one-piece co-molded snap-on apparatuses on the elongate bar structure; and the one or more elongate elements attached to the one or more one-piece co-molded snap-on apparatuses, wherein the one or more one-piece co-molded snap-on apparatuses support the one or more elongate elements routed in the aircraft.

12. The support system of claim 11, further comprising one or more installation clips, each designed for insertion through the at least two through openings of the snap-fit edge portion of each side arm.

13. The support system of claim 12, wherein each side arm further comprises at least two indentations formed on an exterior of the snap-fit edge portion of each side arm, and wherein each of the one or more installation clips is further designed for engagement with the at least two indentations.

14. The support system of claim 11, wherein the one or more elongate elements comprise one or more of:
wires;
cables, including electrical cables, current return network cables, data bus cables, fiber optic cables, high speed transmission cables, and coaxial cables;
tubes; or
hoses.

15. A method of using a one-piece co-molded snap-on apparatus to support one or more elongate elements routed in a structure, the method comprising the steps of:
providing the one-piece co-molded snap-on apparatus comprising:
a ring post comprising one or more rings, each of the one or more rings having an inner circumference and an outer circumference, and a ring body, and wherein each of the one or more rings is integral with, and spaced from, a ring post body, via radially extending spokes, positioned between portions of an exterior of the ring post body and the ring body; and a snap-on attachment base co-molded to the ring post to form the one-piece co-molded snap-on apparatus, the snap-on attachment base comprising:

a top support portion integral with the ring post, the top support portion having curved support surface elements on opposite sides of the top support portion;

a bottom attachment portion integral with the top support portion, the bottom attachment portion having side arms opposite each other and designed to snap fit against opposing sides of an elongate bar structure, each side arm having a snap-fit edge portion formed at a bottom end of each side arm, each snap-fit edge portion having a topmost surface designed to fit against a bottommost surface of the elongate bar structure, and each snap-fit edge portion further having a triangular shape and having at least two through openings, each through opening formed through an outer side of the snap-fit edge portion and through a slope side of the snap-fit edge portion; and at least one centering element projecting from an interior surface of the snap-on attachment base into a channel formed between the side arms, the at least one centering element designed to mate with at least one hole in the elongate bar structure to center the one-piece co-molded snap-on apparatus on the elongate bar structure;

attaching the one-piece co-molded snap-on apparatus to the elongate bar structure, via a snap-on attachment action; and coupling the one or more elongate elements to the one-piece co-molded snap-on apparatus attached to the elongate bar structure, to support the one or more elongate elements routed in the structure.

16. The method of claim 15, wherein the step of providing the one-piece co-molded snap-on apparatus further comprises, providing the one-piece co-molded snap-on apparatus having the ring post comprising one ring, two rings, three rings, four rings, five rings, or six rings.

17. The method of claim 15, wherein the step of attaching the one-piece co-molded snap-on apparatus to the elongate bar structure further comprises:
attaching an installation clip through the at least two through openings in each side arm of the bottom attachment portion, to further secure the one-piece co-molded snap-on apparatus to the elongate bar structure.

18. The method of claim 17, wherein the step of attaching the one-piece co-molded snap-on apparatus to the elongate bar structure further comprises:
engaging portions of the installation clip with at least two indentations formed on an exterior of the snap-fit edge portion of each side arm.

19. The method of claim 15, wherein the step of coupling the one or more elongate elements to the one-piece co-molded snap-on apparatus attached to the elongate bar structure further comprises one or more of:
coupling the one or more elongate elements comprising one or more of: wires;
cables, including electrical cables, current return network cables, data bus cables, fiber optic cables, high speed transmission cables, and coaxial cables;
tubes; or hoses; or coupling a harness bundling the one or more elongate elements.

20. The method of claim 15, wherein the step of coupling the one or more elongate elements to the one-piece co-molded snap-on apparatus attached to the elongate bar structure further comprises:

coupling the one or more elongate elements to the one-piece co-molded snap-on apparatus attached to the elongate bar structure, to support the one or more elongate elements routed in the structure comprising a vehicle, including an aircraft, a rotorcraft, a spacecraft, a watercraft, or an automobile, or an architectural structure, including a building.

* * * * *